(12) United States Patent
Ito et al.

(10) Patent No.: US 7,159,651 B2
(45) Date of Patent: Jan. 9, 2007

(54) AIR CONDITIONER FOR VEHICLE USE

(75) Inventors: Koji Ito, Nagoya (JP); Yasushi Yamanaka, Nakajima-gun (JP); Kazushi Shikata, Kosai (JP); Takahiro Tokunaga, Kariya (JP); Tomohiro Kamiya, Takahama (JP); Masakazu Nagaya, Nagoya (JP); Shinichiro Hirai, Kariya (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 10/947,529

(22) Filed: Sep. 22, 2004

(65) Prior Publication Data

US 2005/0067158 A1 Mar. 31, 2005

(30) Foreign Application Priority Data

Sep. 26, 2003 (JP) ............................. 2003-335704
May 20, 2004 (JP) ............................. 2004-150490

(51) Int. Cl.
*B60H 1/00* (2006.01)
*B60H 3/00* (2006.01)
*B60H 1/32* (2006.01)
*F24F 1/00* (2006.01)

(52) U.S. Cl. .................. 165/202; 165/203; 165/42; 165/43; 165/97; 165/48.1; 62/244; 62/434; 62/435; 62/325

(58) Field of Classification Search ............... 165/202, 165/203, 42, 43, 48.1, 97; 62/244, 434, 435, 62/325
See application file for complete search history.

(56) References Cited

U.S. PATENT DOCUMENTS 4,903,581 A * 2/1990 Nilsson ................. 454/124
5,904,052 A * 5/1999 Inoue et al. ............ 62/244

FOREIGN PATENT DOCUMENTS

| DE | 2513368 A1 | * 10/1975 |
| DE | 3222164 A | * 12/1983 |
| DE | 4307641 A1 | * 9/1994 |
| JP | 54071841 A | * 6/1979 |
| JP | 58-211905 | 12/1983 |
| JP | 63-3283 | 1/1988 |
| JP | 63-20212 | 1/1988 |
| JP | 7-1948 | 1/1995 |
| JP | 11342723 A | * 12/1999 |

* cited by examiner

*Primary Examiner*—John K. Ford
(74) *Attorney, Agent, or Firm*—Harness, Dickey & Pierce, PLC

(57) ABSTRACT

An upper opening portion (74, 75) and lower opening portion (76, 77) are arranged in a door body (13*b*, 14*b*) located below a side window (13*a*, 14*a*), and an air conditioning unit (15, 16) is arranged inside the door body (13*b*, 14*b*), and a rotary position of a scroll casing (62, 63) of a blower (56, 57) is selected so that air can flow from the lower opening portion (76, 77) to the upper opening portion (74, 75) at the time of air-cooling and air can flow from the upper opening portion (74, 75) to the lower opening portion (76, 77) at the time of heating.

8 Claims, 23 Drawing Sheets

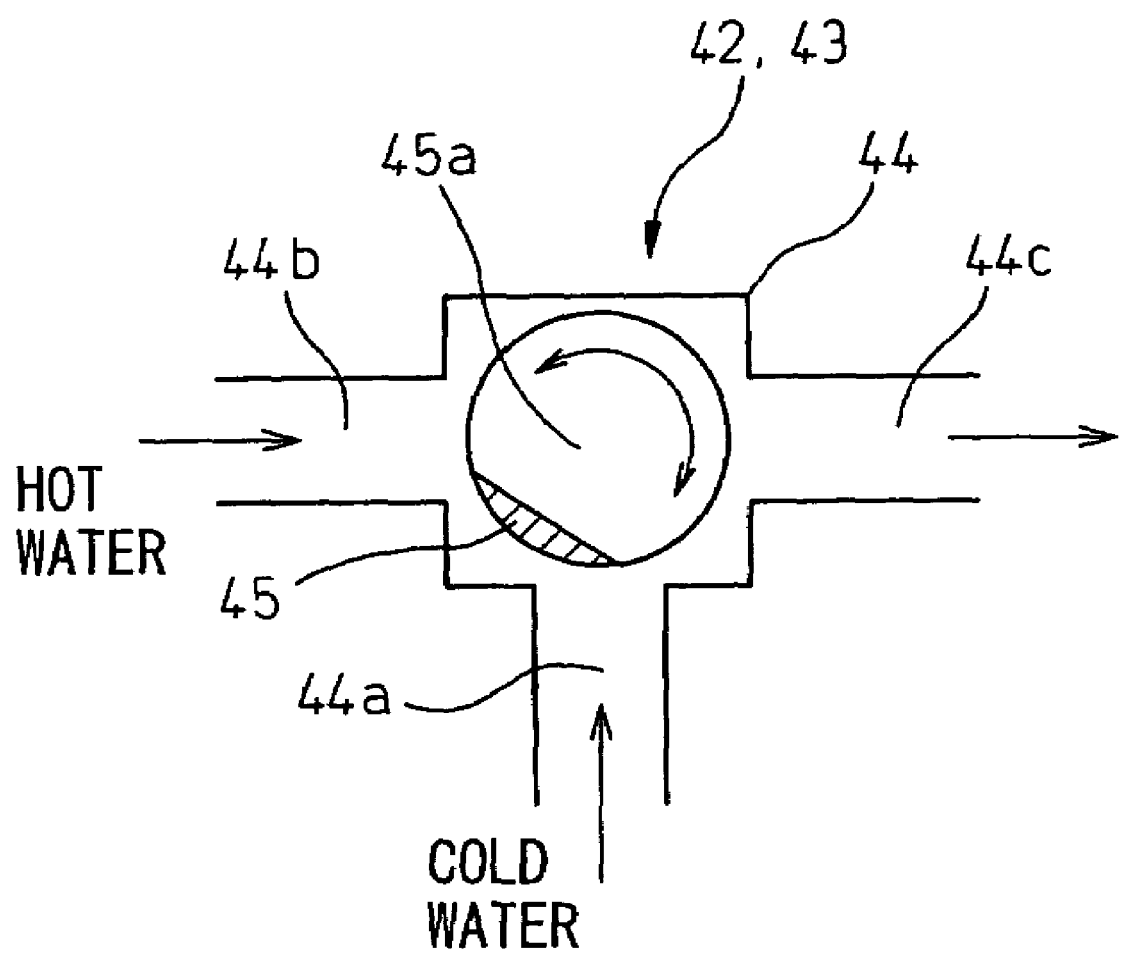

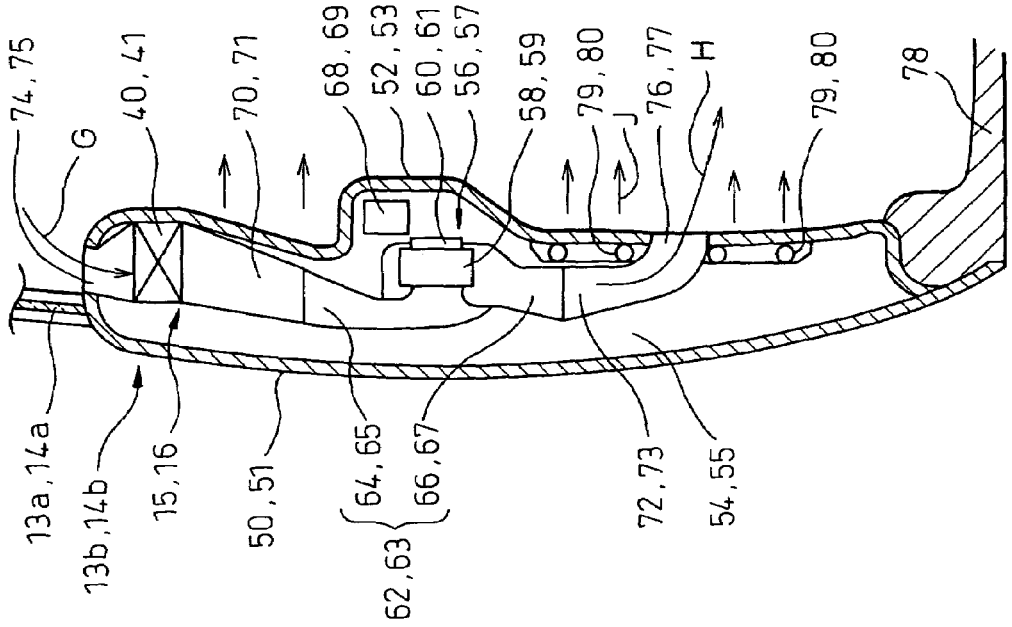
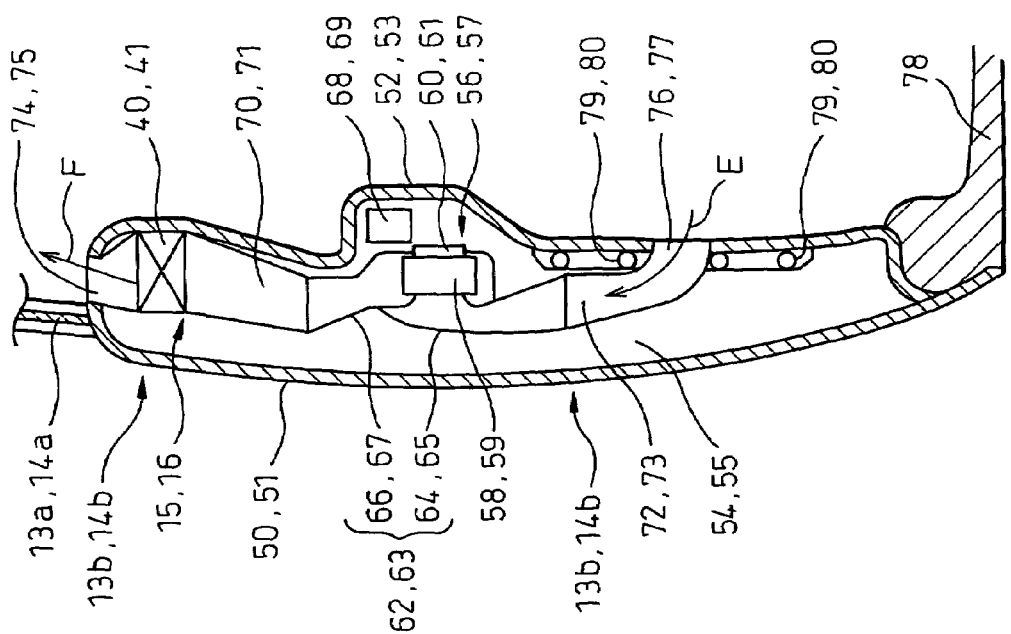

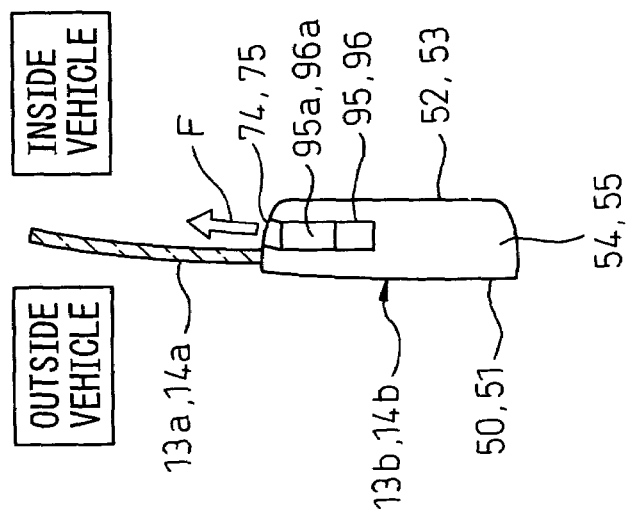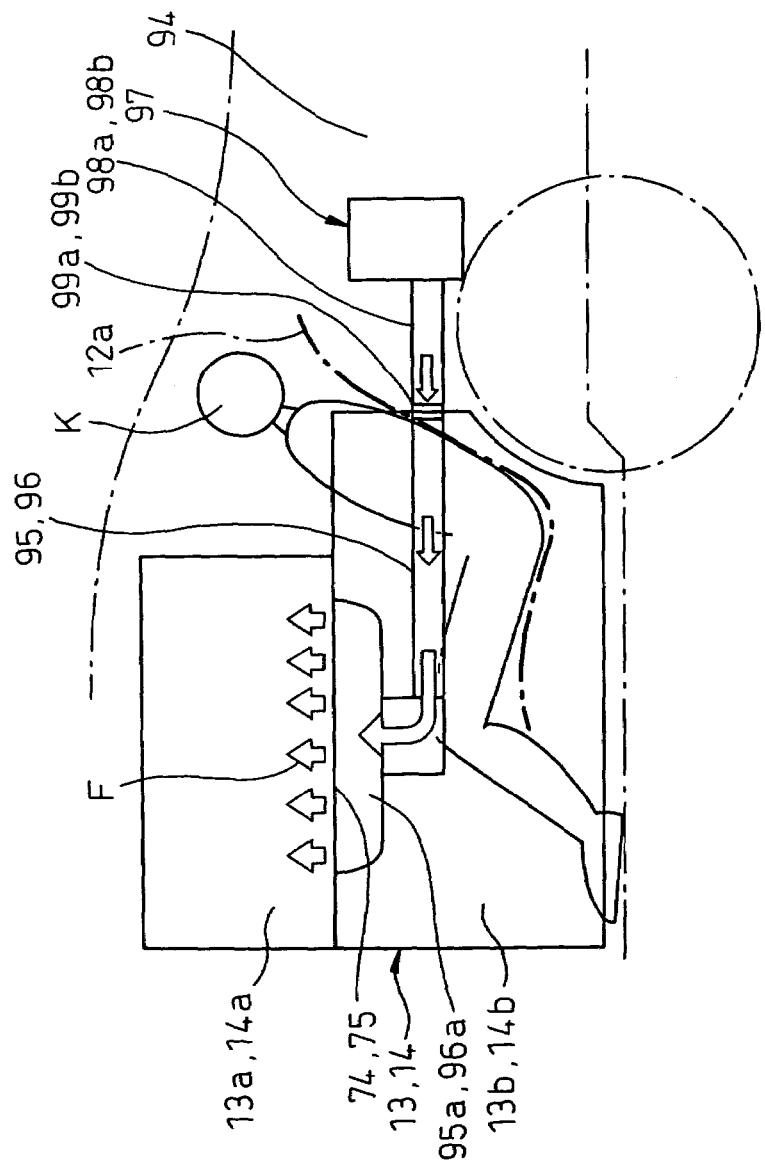

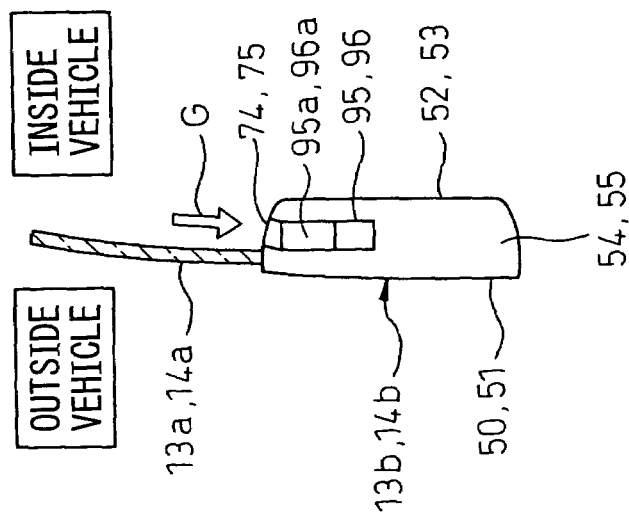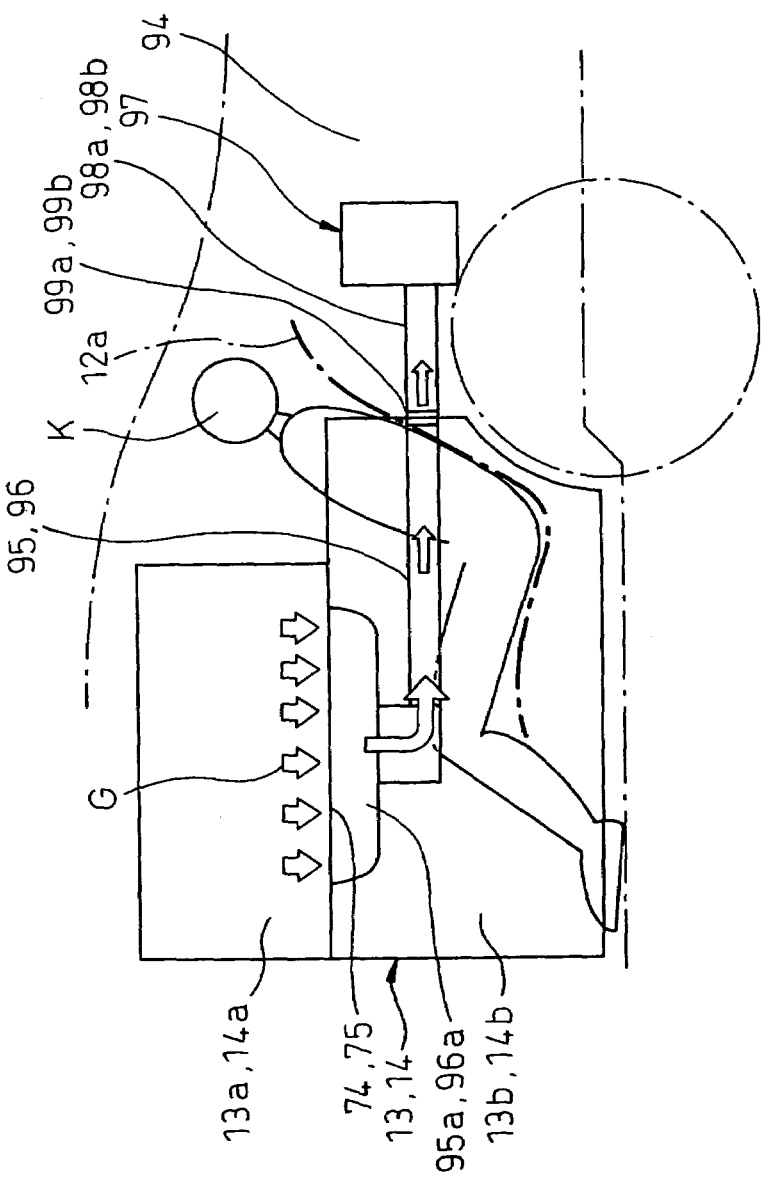

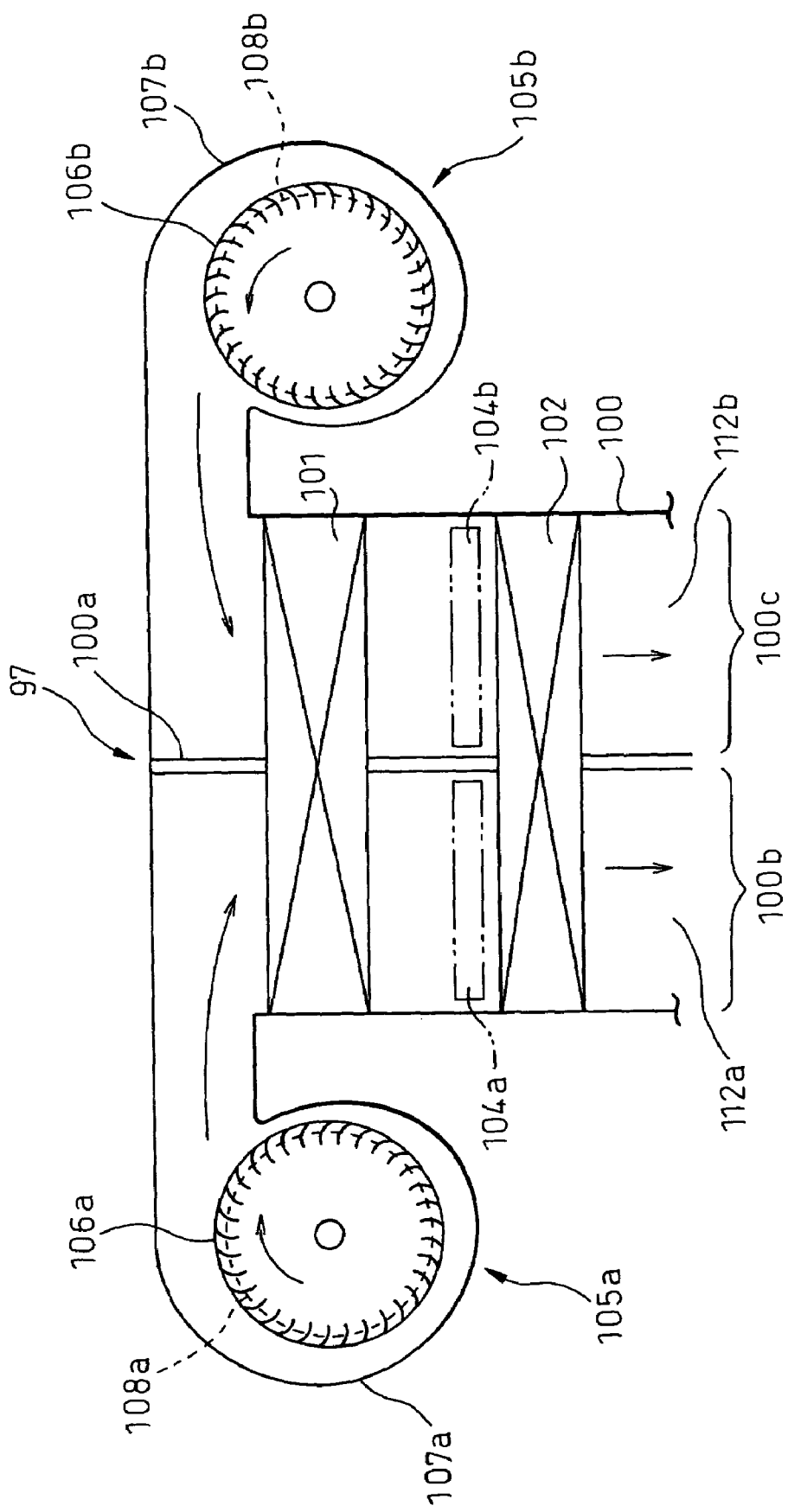

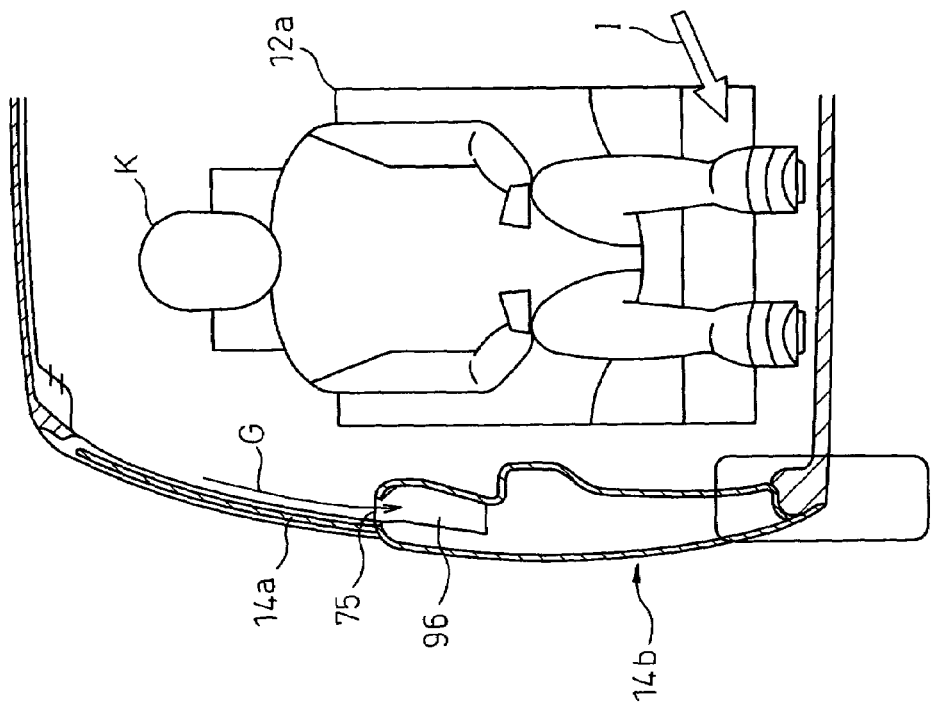
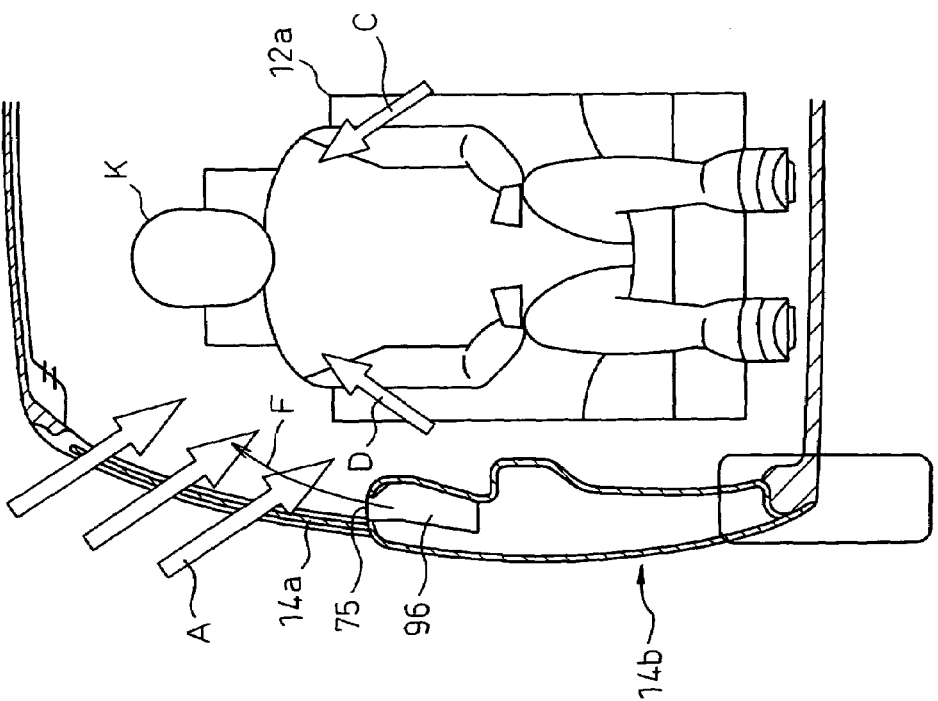

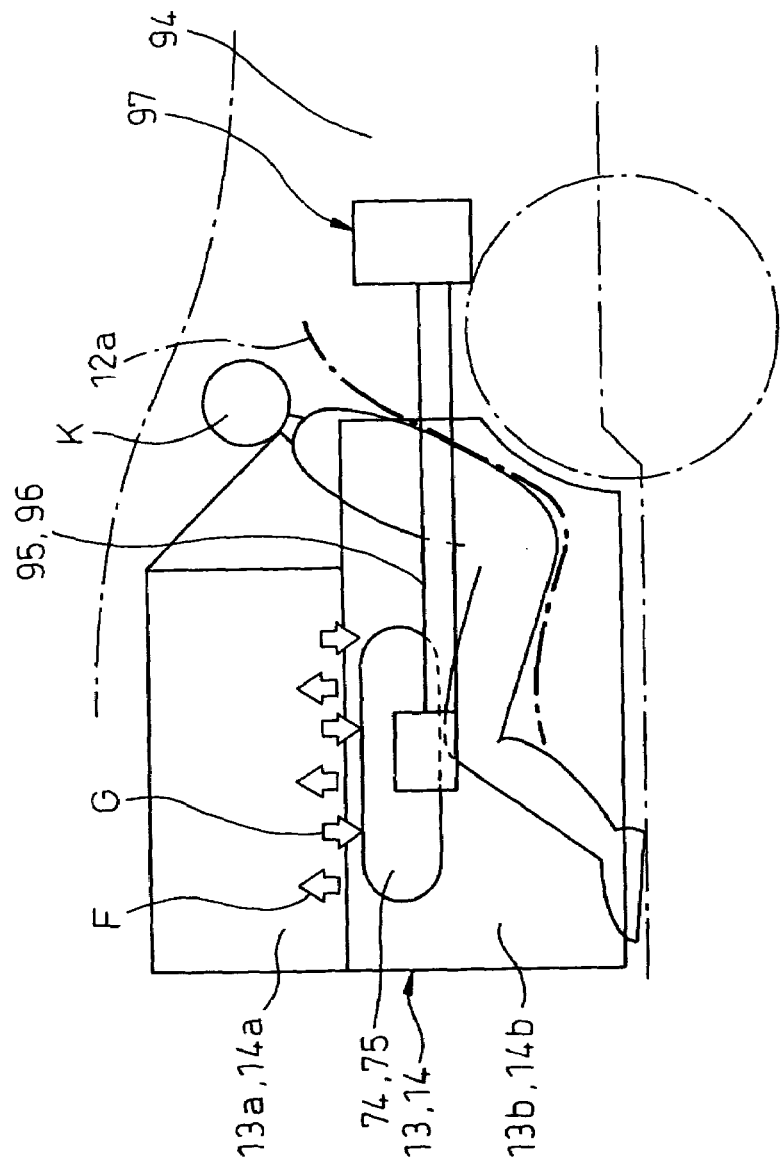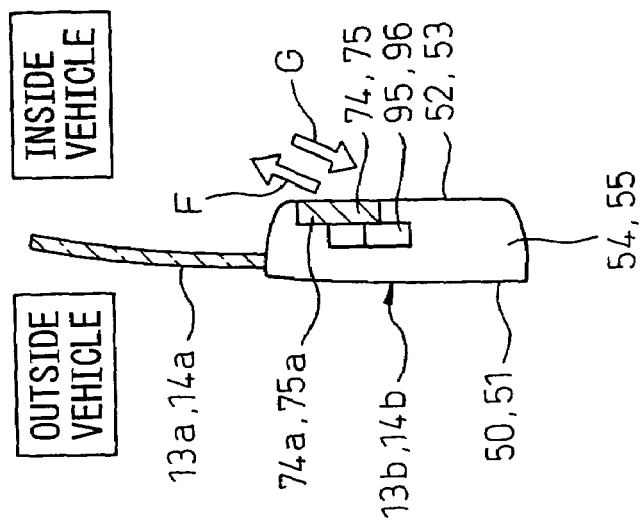

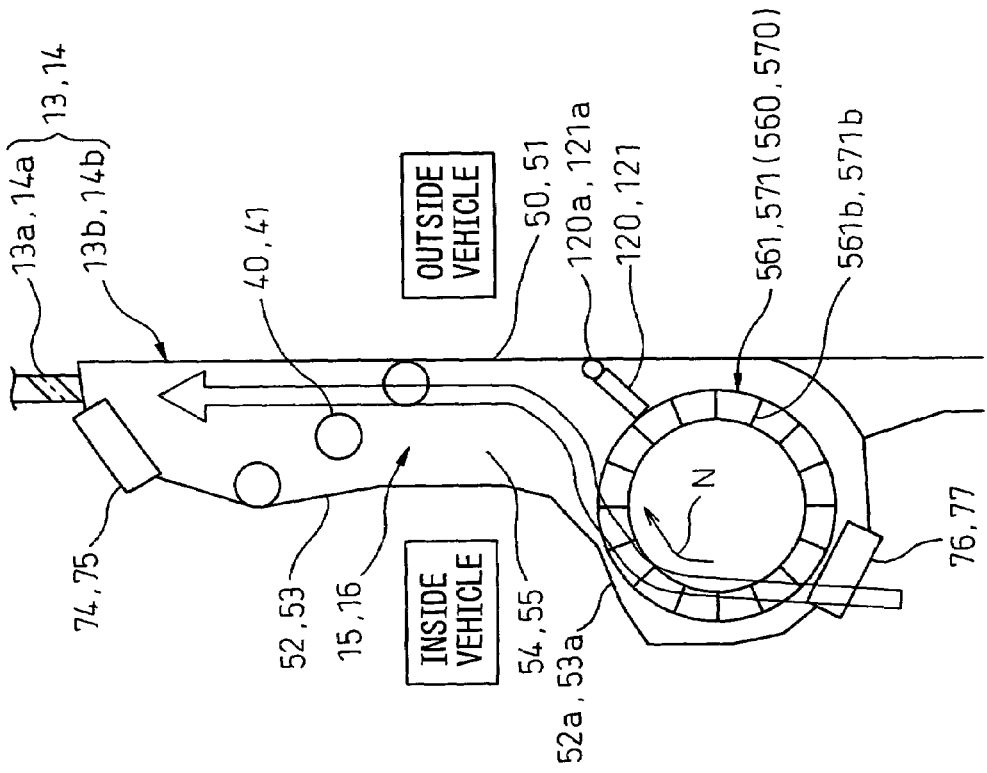
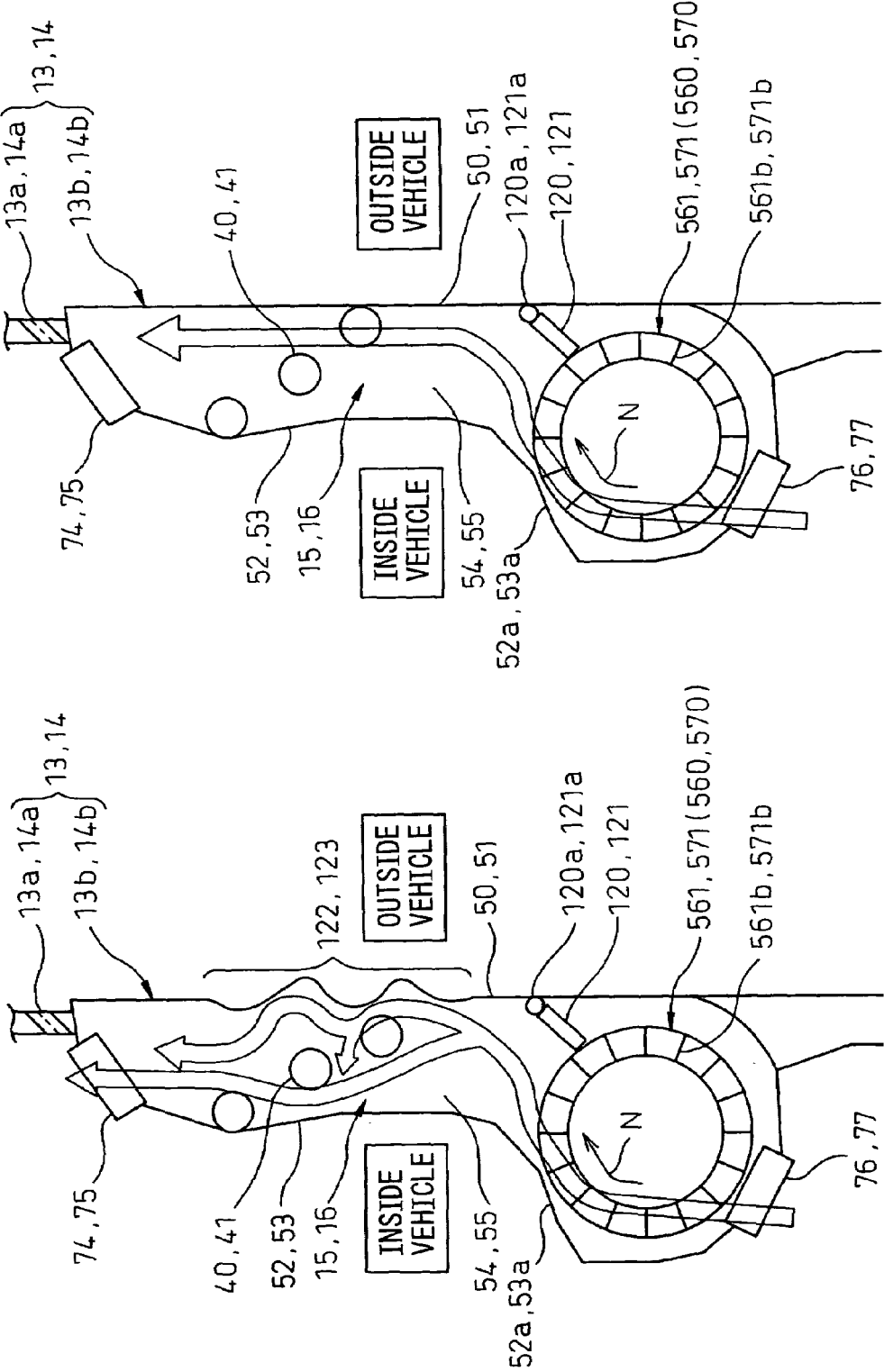

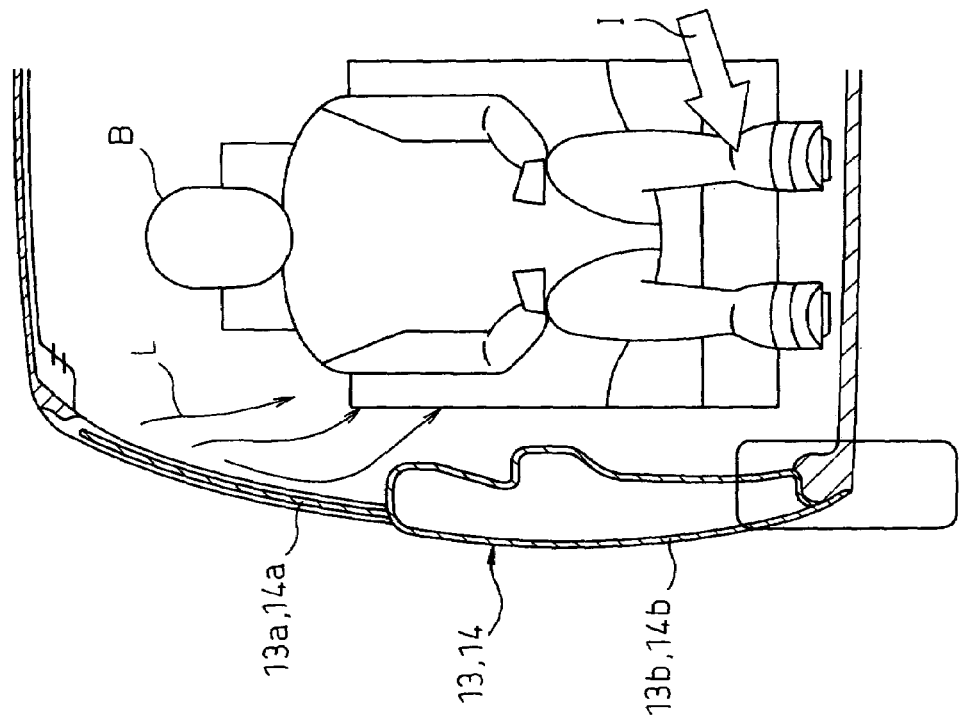
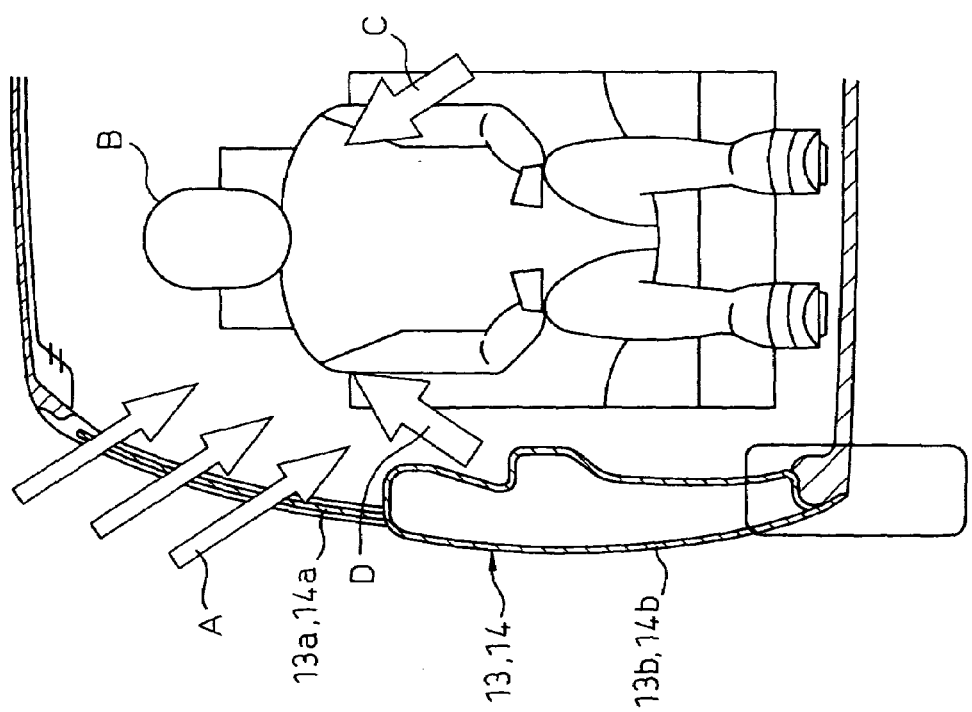

AIR CONDITIONER FOR VEHICLE USE

BACKGROUND OF THE INVENTION

1. Field of the Invention

The present invention relates to an air conditioner for vehicle use in which thermal comfort is improved in the neighborhood of side windows in a vehicle passenger compartment.

2. Description of the Related Art

Recently, there has been an increasing demand for thermal comfort in a vehicle passenger compartment. For example, in the case of sunshine incident from the side of the vehicle into the vehicle passenger compartment, the thermal environment in the right portion in the vehicle passenger compartment and that in the left portion are different from each other. Therefore, it is preferable that the blowout air temperature of air blown out from an air conditioner to the right portion in the vehicle passenger compartment is different from the blowout air temperature of air blown out from the air conditioner to the left portion.

Therefore, in some deluxe cars, a right and left independent temperature control type air conditioner is employed in which the temperature in the right portion of the vehicle passenger compartment and the temperature in the left portion are controlled independently from each other. Recently, there is a tendency for more cars employ this right and left independent temperature control type air conditioner. According to this type of air conditioner, the temperature of air blown out into the right region in the vehicle passenger compartment and that of air blown out into the left region can be independently controlled to temperatures suitable for the environments in the right and the left region.

Another prior art, which is disclosed in the official gazette of Japanese Unexamined Patent Publication No. 58-211905, describes an air conditioner for vehicle use in which a hot air blowout duct extending in the longitudinal direction of a vehicle is provided on the door body portion of the vehicle, and a hot air is blown out from this hot air blowout duct toward the knee and waist of a passenger.

However, it has been made clear that even if the former, that is, a right and left independent temperature control type air conditioner is employed, it is impossible to obtain a sufficiently high thermal comfort in the neighborhood of side windows in the vehicle passenger compartment.

FIG. 25A is a view for explaining an air-conditioned state in the neighborhood of side windows in a vehicle passenger compartment in summer. In FIG. 25A, the state is shown in which sunshine A is incident on the right portion of the upper half body of passenger B through side windows 13a, 14a of the vehicle doors 13, 14. At this time, cold air C is blown out from a center face blowout port (not shown in the drawing), which is arranged close to the central portion of the instrument panel of the vehicle, to the upper half body of the passenger, and cold air D is blown out from a side face blowout port (not shown in the drawing), which is arranged in a portion close to each end portion of the instrument panel of the vehicle in the lateral direction, to the upper half body of the passenger.

At this time, when the blowout air temperatures of cold air C and D are adjusted according to a quantity of the sunshine, it is possible to air-condition the right and left regions in the vehicle passenger compartment while an intensity of air-conditioning is being well balanced with a change in the quantity of the sunshine. However, the sunshine is directly incident on the right portion of the upper half of the body of passenger A which is located on the left in FIG. 25A, and the sunshine is not incident on the left portion of the upper half of the body of passenger A which is located on the right in FIG. 25A. However, cold air C and D are blown out while the temperature of cold air C and that of cold air D are controlled to the same temperature. Therefore, passenger A feels hot in the left portion of the upper half body. On the contrary, passenger A feels cold in the right portion of the upper half body.

That is, it is impossible to give an appropriate thermal feeling to the right and left upper half portions of passenger A according to the intensity of the sunshine. As a result, it is impossible to provide a sufficiently high thermal comfort at the time of air conditioning.

Next, FIG. 25B is a view for explaining a heated state in the neighborhood of side windows in the vehicle passenger compartment in winter. Hot air I is blown out from a foot blowout port, which is arranged in a lower portion of the instrument panel of the vehicle, to the foot portion of passenger A. Therefore, the foot portion of passenger A can be heated.

In this connection, in winter, these side windows 13a, 14a are cooled by the outside air of low temperature. Therefore, the temperatures of these side windows 13a, 14a are low. Accordingly, air in the vehicle passenger compartment in the neighborhood of these side windows 13a, 14a is cooled, and the temperature of the air is low. This air of low temperature is directed downward as shown by arrow L because a difference of density exists between this air of low temperature and hot air I blowing to the foot portion. Accordingly, passenger A tends to feel cold in the right shoulder and the right knee. It is impossible to solve these problems, in which passenger A feels cold in the right shoulder and the right knee, only by blowing out a hot air to the foot portion. Therefore, the thermal comfort is insufficient at the time of heating.

According to the latter prior art described before, only the feeling of heating of the knee and waist of the passenger can be improved. It is impossible to solve the problems in which passenger A feels hot in the upper half body by sunshine A at the time of air conditioning shown in FIG. 25A. It is also impossible to solve the problems in which passenger A feels cold in the shoulder by the cold air in the neighborhood of the side windows 13a, 14a at the time of heating shown in FIG. 25B. Therefore, it is impossible to provide a sufficiently high thermal comfort.

SUMMARY OF THE INVENTION

The present invention has been accomplished to solve the above problems of the prior art. It is an object of the present invention to enhance a thermal comfort of a passenger in the neighborhood of side windows in a vehicle passenger compartment.

In order to accomplish the above object, according to a first aspect of the present invention, there is provided an air conditioner for vehicle use comprising:

an opening portion (74, 75) provided in an upper portion of a vehicle side member (13b, 14b) located in a lower portion of a side window (13a, 14a) of a vehicle; and an air conditioning unit (15, 16, 97) including a cooling and heating means (40, 41, 101, 102) for cooling and heating air and also including a blower (56, 57, 105a, 105b) for blowing air through the cooling and heating means (40, 41, 101, 102), wherein at the time of air-cooling, cooled air is sent into the opening portion (74, 75) through the cooling and heating means (40, 41, 101, 102) and blown out from the opening portion (74, 75) to an upper half body of a passenger on the side of the side window, at the time of air-heating, air in the neighborhood of an inner face of the side window (13a, 14a) is sucked from the opening portion (74, 75) and made to pass in the cooling and heating means (40, 41, 101, 102) so that the air can be heated, and the thus heated air is blown out to a foot side of the passenger.

According to the present invention, an opening portion (74, 75) is located in an upper portion of a vehicle body side member (13b, 14b) in a lower portion of a side window (13a, 14a). In other words, the opening portion (74, 75) is located at a position close to a lower end portion of the side window (13a, 14a). Therefore, at the time of air-cooling, cooled air can be blown out from this opening (74, 75) to the upper half portion of a passenger on the side of the side window.

Accordingly, even in the case where a sunshine is incident on the upper half body on the right or left of the passenger, the problem in which the passenger feels hot in the upper half body of the passenger on the side of the side window can be excellently solved by cold air blown out from the opening portion (74, 75). Therefore, the thermal comfort of the passenger at the time of air-cooling can be enhanced.

At the time of air-heating, air of low temperature close to the inner face of the side window (13a, 14a) can be positively sucked into the opening portion (74, 75) located at a position close to the lower end portion of the side window. Therefore, it is possible to excellently solve the problems in which the passenger feels cold in the upper half body on the side of the side window by the air of low temperature existing in the neighborhood of the inner face of the side window.

Due to the foregoing, the thermal comfort of the passenger can be always enhanced from summer, in which air-cooing is conducted, to winter, in which air-heating is conducted. Further, one opening portion (74, 75) located close to the lower end portion of the side window is used for both the blowout port of air at the time of air-cooling and the suction port of air at the time of air-heating. Therefore, the overall constitution of the air conditioner is relatively simple.

In this connection, the side member on the vehicle body side in the lower portion of the side window is usually a door body located at a lower position of the side window of the vehicle door. However, when the side window is directly provided in the side wall portion (the stationary side wall portion) of the vehicle body, the side wall portion of the vehicle body, which is located at a lower position of the side window, corresponds to "the member on the vehicle body side at a lower position of the side window".

According to a second aspect of the present invention, there is provided an air conditioner for vehicle use according to the first aspect, further comprising an air flow changeover means (62, 63, 115a, 115b, 116a, 116b, 117a, 117b), the air flow changeover means communicating a blowout side of the blower (56, 57, 105a, 105b) with the opening portion (74, 75) and also communicating a suction side of the blower (56, 57, 105a, 105b) with a suction port (76, 77, 110a, 110b) to suck air from a vehicle passenger compartment at the time of air-cooling, and the air flow changeover means also communicating the blowout side of the blower (56, 57, 105a, 105b) with a blowout port (76, 77, 114a, 114b) to blow out air to a foot side of the passenger and also communicating the suction side of the blower (56, 57, 105a, 105b) with the opening portion (74, 75) at the time of air-heating.

Due to the foregoing, the air flow changeover means can change over between a state in which the opening portion (74, 75) acts as a blowout port at the time of air-cooling and a state in which the opening portion (74, 75) acts as a suction port to suck air from the vehicle passenger compartment at the time of air-heating.

According to a third aspect of the present invention, there is provided an air conditioner for vehicle use mounted on a vehicle provided with a vehicle door (13, 14) having a side window (13a, 14a) and also having a door body (13b, 14b) located in a lower portion of the side window (13a, 14a), comprising:

an upper opening portion (74, 75) provided in an upper portion of the door body (13b, 14b) and open to a vehicle passenger compartment;

a lower opening portion (76, 77) provided in a lower portion of the door body (13b, 14b) and open to the vehicle passenger compartment; and an air conditioning unit (15, 16) arranged inside the door body (13b, 14b), wherein the air conditioning unit (15, 16) includes a cooling and heating means (40, 41) for cooling and heating air and also includes a blower (56, 57, 560, 570, 565, 575) for blowing air through the cooling and heating means (40, 41), at the time of air-cooling, air is sucked from a vehicle passenger compartment into the lower opening portion (76, 77) and is made to pass through the cooling and heating means (40, 41) so that the air can be cooled, the thus cooled air is sent to the upper opening portion (74, 75) and blown out from the upper opening portion (74, 75) to an upper half body of a passenger on the side of a side window, at the time of air-heating, air is sucked from a neighborhood of an inner face of the side window (13a, 14a) into the upper opening portion (74, 75) and is made to pass through the cooling and heating means (40, 41) so that the air can be heated, and the thus heated air is sent to the lower opening portion (76, 77) and blown out from the lower opening portion (76, 77) to a foot side of the passenger.

The third aspect of the present invention is different from the first aspect as follows. The air conditioning unit (15, 16) is arranged inside the door body (13b, 14b), and both the upper opening portion (74, 75) and the lower opening portion (76, 77) are provided in the door body (13b, 14b).

Due to the foregoing, the upper opening portion (74, 75) of the door body (13b, 14b) functions as a blowout port at the time of air-cooling and a suction port at the time of air-heating. Therefore, the thermal comfort of the passenger can be enhanced in the same manner as that of claim 1.

Since both the upper opening portion (74, 75) and the lower opening portion (76, 77) are provided in the door body (13b, 14b) and one of them functions as a suction port and the other functions as a blowout port, all air passages for air-cooling and air-heating can be composed in the door body (13b, 14b).

Accordingly, it is unnecessary to compose an air passage of the air conditioning unit (15, 16) outside the door body (13b, 14b), and the air conditioning unit of the air conditioner can be compactly arranged in the door body.

When the air conditioning unit is arranged outside the door body (13b, 14b), a heat loss is generated in the duct arranged from the air conditioning unit outside the door to the air passage in the door body (13b, 14b). However, according to the third aspect, it is possible to eliminate a heat loss generated in this duct portion. Therefore, it is possible to sufficiently lower the temperature of cold air blown out from the upper opening portion (74, 75) at the time of air-cooling. Further, it is possible to sufficiently raise the temperature of hot air blown out from the lower opening portion (76, 77) at the time of air-heating. Accordingly, the maximum air-cooling performance and the maximum air-heating performance can be enhanced.

According to a fourth aspect of the present invention, there is provided an air conditioner for vehicle use according to the third aspect, wherein the cooling and heating means includes one heat exchanger (40, 41) into which a thermal medium for cooling flows at the time of air-cooling so as to cool the sucked air, and into which a thermal medium for heating flows at the time of air-heating so as to heat the sucked air.

According to this constitution, only one heat exchanger to be built in the door body is sufficient for air-cooling and air-heating. Therefore, it becomes easy to incorporate the air conditioning unit into the door body.

According to a fifth aspect of the present invention, there is provided an air conditioner for vehicle use according to the fourth aspect, wherein an air guide face (122, 123) including at least a convex portion for guiding an air flow to an inner plate (52, 53) side of the door body (13b, 14b) is provided in a portion of an outer plate (50, 51) of the door body (13b, 14b) opposed to the heat exchanger (40, 41).

Due to this constitution, by the convex portion formed on the air guide face (122, 123), after a flow of air inside the door body (13b, 14b) has passed through the heat exchanger (40, 41) it can be positively guided onto the side of the inner plate (52, 53) of the door body (13b, 14b). Therefore, it is possible to increase a quantity of air coming into contact with the heat exchanger (40, 41) so that the heat transmission performance of the heat exchanger (40, 41) can be enhanced, and it becomes possible to adjust the temperature of the inner plate (52, 53) by a hot air or cold air which has been heated or cooled by the heat exchanger (40, 41).

Accordingly, when a passenger comes into contact with the inner plate (52, 53), at the time of air-cooling, the passenger can obtain a feeling of cold contact, and at the time of air-heating, the passenger can obtain a feeling of hot contact, by which the comfort of the passenger can be further enhanced.

According to a sixth aspect of the present invention, there is provided an air conditioner for vehicle use according to the fourth or fifth aspect, wherein a thermal medium pipe (79, 80) for circulating a thermal medium for cooling and a thermal medium for heating in the heat exchanger (40, 41) is arranged so that the thermal medium pipe (79, 80) can be thermally combined with the inner plate (52, 53) of the door body (13b, 14b).

Due to the foregoing, at the time of air-heating, by the heat of the thermal medium used for heating, the temperature of the inner plate (52, 53) of the door body (13b, 14b) can be maintained at a temperature sufficiently higher than the vehicle passenger compartment temperature, and the lower half body of the passenger can be heated by the radiant heat sent from the inner plate (52, 53). Therefore, the thermal comfort of the passenger can be further enhanced at the time of air-heating.

According to the sixth aspect, in the same manner as that of the fifth aspect, when the temperature of the inner plate (52, 53) itself is adjusted, the comfort can be enhanced by the contact of the passenger with the inner plate (52, 53).

According to a seventh aspect of the present invention, there is provided an air conditioner for vehicle use according to one of the fourth to sixth aspects, wherein the thermal medium for heating is hot water heated by a heat source mounted on a vehicle, the thermal medium for cooling is cold water cooled by a cooling source (20) mounted on the vehicle, and the air conditioner for vehicle use includes a valve means for adjusting a flow of the hot and cold water to the heat exchanger (40, 41).

Due to the foregoing, when the valve means (42, 43) changes over between the flow of hot water flowing into the heat exchanger (40, 41) and the flow of cold water flowing into the heat exchanger (40, 41), it is possible to change over between the air-cooling mode and the air-heating mode and, further, it is possible to control the temperature of an air blown out into the vehicle passenger compartment in the air-cooling mode and the air-heating mode.

In this connection, specifically, the heating source mounted on the vehicle is a vehicle engine, and the cooling source (20) mounted on the vehicle is a refrigerating cycle driven by the vehicle engine.

According to an eighth aspect of the present invention, there is provided an air conditioner for vehicle use according to one of the third to seventh aspects, further comprising an air flow changeover means (62, 63), the air flow changeover means (62, 63) communicating a blowout side of the blower (56, 57) with the upper opening portion (74, 75) and also communicating a suction side of the blower (56, 57) with the lower opening portion (76, 77) at the time of air-cooling, and the air flow changeover means communicating the blowout side of the blower (56, 57) with the lower opening portion (76, 77) and also communicating the suction side of the blower (56, 57) with the upper opening portion (74, 75) at the time of air-heating.

Due to the foregoing, the air flow changeover means (62, 63) can change over between the air-cooling state, in which the upper opening portion (74, 75) acts as a blowout port and the lower opening portion (76, 77) acts as an air suction port to suck air from the vehicle passenger compartment, and the air-heating state, in which the upper opening portion (74, 75) acts as an air suction port to suck air from the vehicle passenger compartment and the lower opening portion (76, 77) acts as a blowout port.

According to a ninth aspect of the present invention, there is provided an air conditioner for vehicle use according to the eighth aspect, wherein the blower (56, 57) includes a casing (62, 63) having an air sucking portion (64, 65) and a blowout portion (66, 67), the casing (62, 63) is composed being capable of rotating, and the air flow changeover means is comprised of the casing (62, 63) capable of rotating.

According to a tenth aspect of the present invention, there is provided an air conditioner for vehicle use according to the eighth aspect, wherein the blower (56, 57) includes a centrifugal fan (58, 59) and a scroll casing (62, 63) for accommodating the centrifugal fan (58, 59), the scroll casing (62, 63) includes a suction duct (64, 65) and a blowout duct (66, 67) which are arranged being opposed to each other in the opposite direction and spaced from each other by about 180° in the circumferential direction of the scroll casing (62, 63), the scroll casing (62, 63) is pivotally composed being integrated with the suction duct (64, 65) and the blowout duct (66, 67), and the air flow changeover means (62, 63) is comprised of the scroll casing (62, 63) capable of rotating.

According to an eleventh aspect of the present invention, there is provided an air conditioner according to one of the third to seventh aspects, wherein the blower (560, 570) includes a cross flow fan (561, 571) and a motor (562, 572) for driving the cross flow fan (561, 571), the cross flow fan (561, 571) can be rotated by the motor (562, 572) in both the normal and the reverse direction, the cross flow fan (561, 571) is rotated at the time of air-cooling in a direction so that air, which is sucked from the vehicle passenger compartment into the lower opening portion (76, 77), can be sent to the upper opening portion (74, 75), and the cross flow fan (561, 571) is rotated at the time of air-heating in a direction so that air in the neighborhood of an inner face of the side window (13a, 14a), which has been sucked from the upper opening portion (74, 75), can be sent to the lower opening portion (76, 77).

In this case, the cross flow fan (561, 571) is a fan in which a current of air passes through in a cross section perpendicular to the axial direction. Compared with the centrifugal fan described in claim 10, this cross flow fan (561, 571) is composed in such a manner that the size in the axial direction is large and the size in the radial direction is small. Therefore, the cross flow fan can be easily mounted in a small space, the width of which is narrow, formed inside the door body (13b, 14b).

According to a twelfth aspect of the present invention, there is provided an air conditioner for vehicle use according to the eleventh aspect, wherein an arm rest portion (52a, 53a), the shape of which is a convex shape extending in the longitudinal direction of a vehicle, is formed on the inner plate (52, 53) of the door body (13b, 14b), and the blower (560, 570) is arranged inside the convex shape of the arm rest portion (51a, 53a) in such a manner that the blower (560, 570) is formed into an elongated shape and extended in the longitudinal direction of the vehicle.

Due to the foregoing, when the inside space which is formed in the convex portion of the arm rest portion (52a, 53a) provided on the inner plate (52, 53) of the door body (13b, 14b) is effectively utilized, the cross flow fan (561, 571) can be easily mounted inside the door body (13b, 14b).

According to a thirteen aspect of the present invention, there is provided an air conditioner for vehicle use according to one of the third to seventh aspects, wherein the blower (565, 575) includes an axial fan (565a, 575a) and a motor (565b, 575b) for driving the axial fan (565a, 575a), a plurality of blowers (565, 575) are arranged in parallel inside the door body (13b, 14b) in the longitudinal direction of the vehicle, the axial fan (565a, 575a) can be rotated by the motor (565b, 575b) in both the normal and the reverse direction, the axial fans (565a, 575a) of the plurality of blowers (565, 575) are rotated in a direction so that air, which has been sucked from the vehicle passenger compartment into the lower opening portion (76, 77), can be sent to the upper opening portion (74, 75) at the time of air-cooling, and the axial fans (565a, 575a) of the plurality of blowers (565, 575) are rotated in a direction so that air in the neighborhood of an inner face of the side window (13a, 14a), which has been sucked from the upper opening portion (74, 75), can be sent to the lower opening portion (76, 77) at the time of air-heating.

As described above, when a plurality of axial flow blowers (565, 575) are rotated in the normal and the reverse direction so that the air flowing direction can be changed over between the upper opening portion (74, 75) and the lower opening portion (76, 77), the thermal comfort of the passenger can be enhanced.

According to a fourteenth aspect of the present invention, there is provided an air conditioner for vehicle use mounted on a vehicle provided with a vehicle door (13, 14) having a side window (13a, 14a) and also having a door body (13b, 14b) located in a lower portion of the side window (13a, 14a), comprising:

an opening portion (74, 75) provided in an upper portion of the door body (13b, 14b) and open to a vehicle passenger compartment;

an air conditioning unit (97) arranged at a position outside the vehicle door (13, 14);

a vehicle passenger compartment air suction port (110a, 110b), which is located at a position outside the vehicle door (13, 14) and open to the vehicle passenger compartment, for sucking air from the vehicle passenger compartment; and a foot blowout port (114a, 114b), which is open to a foot side of a passenger in the vehicle passenger compartment at a position outside the vehicle door (13, 14), for blowing out air to the foot side of the passenger, wherein the air conditioning unit (97) includes a cooling and heating means (101, 102) for cooling and heating air and a blower (105a, 105b) for blowing air through the cooling and heating means (101, 102), at the time of air-cooling, air is sucked from the vehicle passenger compartment into the vehicle passenger compartment air suction port (110a, 110b) and cooled by the cooling and heating means (101, 102), and this cooled air is sent into the opening portion (74, 75) and blown out from the opening portion (74, 75) to an upper half body of a passenger on the side of a side window, at the time of air-heating, air in the neighborhood of the inner face of the side window (13a, 14a) is sucked from the opening portion (74, 75) and heated by the cooling and heating means (101, 102), and the thus heated air is sent into the foot blowout port (114a, 114b) and blown out from the blowout port (114a, 114b) to the foot side of the passenger.

The fourteenth aspect of the present invention is different from the third aspect at the point that the air conditioning unit (97) is arranged at a position outside the vehicle door (13, 14). While this constitution is being employed, in the same manner as that of the third aspect, at the time of air-cooling, a cold air is blown out from the upper opening portion (74, 75) of the door body (13b, 14b) to the upper half of the body of the passenger on the side of the side window, and at the time of air-heating, air existing in a portion close to the inner face of the side window is sucked from the upper opening portion (74, 75) of the door body (13b, 14b). In this way, thermal comfort can be enhanced at the time of air-cooling and air-heating.

Further, when the air conditioning unit (97) is arranged at a position outside the vehicle door (13, 14), the degree of freedom of selecting a position at which the air conditioning unit (97) is arranged can be increased. Therefore, the air conditioning unit (97) can be easily mounted on a vehicle.

According to a fifteenth aspect of the present invention, there is provided an air conditioner for vehicle use according to the fourteenth aspect, wherein the air conditioning unit (97) is specifically arranged on the rear side of the rear seat (12a) of the vehicle.

According to a sixteenth aspect of the present invention, there is provided an air conditioner for vehicle use according to the fourteenth or fifteenth aspect, wherein the opening portion (74, 75) is arranged in an upper portion of the door body (13b, 14b) of the door (13, 14), the foot blowout ports (114a, 114b) are arranged on both sides of the vehicle passenger compartment, and the air conditioning unit (97) can independently adjust a blowout air temperature of air blown out to the left of the vehicle passenger compartment and a blowout air temperature of air blown out to the right of the vehicle passenger compartment.

Due to the foregoing, even when only one air conditioning unit (97) is provided, the temperature of cooled air blown out from the right and left opening portions (74, 75) and the temperature of heated air blown out from the right and left foot blowout port (114a, 114b) can be independently adjusted according to the right and the left environmental condition in the vehicle passenger compartment.

According to a seventeenth aspect of the present invention, there is provided an air conditioner for vehicle use according to one of the fourteenth to sixteenth aspects, further comprising an air flow changeover means (115a, 115b, 116a, 116b, 117a, 117b), the air flow changeover means communicating a blowout side of the blower (105a, 105b) with the opening portion (74, 75), the air flow changeover means also communicating a suction side of the blower (105a, 105b) with a suction port (110a, 110b) to suck air from a vehicle passenger compartment at the time of air-cooling, and the air flow changeover means also communicating the blowout side of the blower (105a, 105b) with the foot blowout port (114a, 114b) to blow out air to a foot side of the passenger and the air flow changeover means also communicating the suction side of the blower (105a, 105b) with the opening portion (74, 75) at the time of air-heating.

Due to the foregoing, the air flow changeover means can change over between the state of air-cooling, in which air is sucked from the vehicle passenger compartment into the air suction port (110a, 110b) in the vehicle passenger compartment and the opening portion (74, 75) acts as a blowout port of cooled air, and the state of air-heating in which the opening portion (74, 75) acts as a suction port of air in the vehicle passenger compartment and the thus sucked air flows to the foot blowout port (114, 114b).

According to an eighteenth aspect of the present invention, there is provided an air conditioner for vehicle use according to the seventeenth aspect, wherein the air flow changeover means includes a plurality of doors (115a, 115b, 116a, 116b, 117a, 117b) for changing over between the communication and the shut-off of the suction side and the blowout side of the blower (105a, 105b) with respect to the passage on the opening portion (74, 75) side, the passage on the vehicle passenger compartment air suction port (110a, 110b) side and the passage on the foot blowout port (114a, 114b) side.

According to a nineteenth aspect of the present invention, there is provided an air conditioner for vehicle use according to one of the fourteenth to eighteenth aspects, wherein the cooling and heating means includes a heat exchanger (101) for cooling air when a thermal medium for cooling flows into the heat exchanger (101) and also includes a heat exchanger (102) for heating air when a thermal medium for heating flows into the heat exchanger (102).

The present invention may be more fully understood from the description of preferred embodiments of the invention set forth below, together with the accompanying drawings.

BRIEF DESCRIPTION OF THE DRAWINGS

FIG. 3 is a schematic sectional view showing a cold and hot water changeover valve shown in FIG. 2.

FIG. 4A is a sectional view showing an air conditioning unit provided inside a door of the first embodiment at the time of air-cooling.

FIG. 4B is a sectional view showing an air conditioning unit provided inside a door of the first embodiment at the time of air-heating.

FIG. 8A is a schematic side view of the rear side of a vehicle at the time of air-cooling on which an air conditioner for vehicle use of the second embodiment is mounted.

FIG. 8B is a sectional view of the vehicle door shown in FIG. 8A.

FIG. 9A is a schematic side view of the rear side of a vehicle at the time of air-heating on which an air conditioner for vehicle use of the second embodiment is mounted.

FIG. 9B is a sectional view of the vehicle door shown in FIG. 9A.

FIG. 12 is a schematic sectional view showing an air passage structure of right and left independent control in the air conditioning unit of the second embodiment.

FIG. 13A is a schematic illustration for explaining an effect of enhancement of the thermal comfort of the second embodiment at the time of air-cooling.

FIG. 13B is a schematic illustration for explaining an effect of enhancement of the thermal comfort of the second embodiment at the time of air-heating.

FIG. 14A is a schematic side view showing a rear portion side of a vehicle on which an air conditioner for vehicle use of the third embodiment is mounted.

FIG. 14B is a sectional view showing a vehicle door portion illustrated in FIG. 14A.

FIG. 21A is a schematic sectional view of a vehicle door portion showing an air conditioning unit of the fifth embodiment at the time of air-cooling.

FIG. 21B is a schematic sectional view of a vehicle door portion showing an air conditioning unit of a comparative example at the time of air-cooling.

FIG. 25A is a schematic illustration for explaining a deterioration of the thermal comfort of the prior art at the time of air-cooling.

FIG. 25B is a schematic illustration for explaining a deterioration of the thermal comfort of the prior art at the time of air-heating.

DESCRIPTION OF PREFERRED EMBODIMENTS

Figure 1:
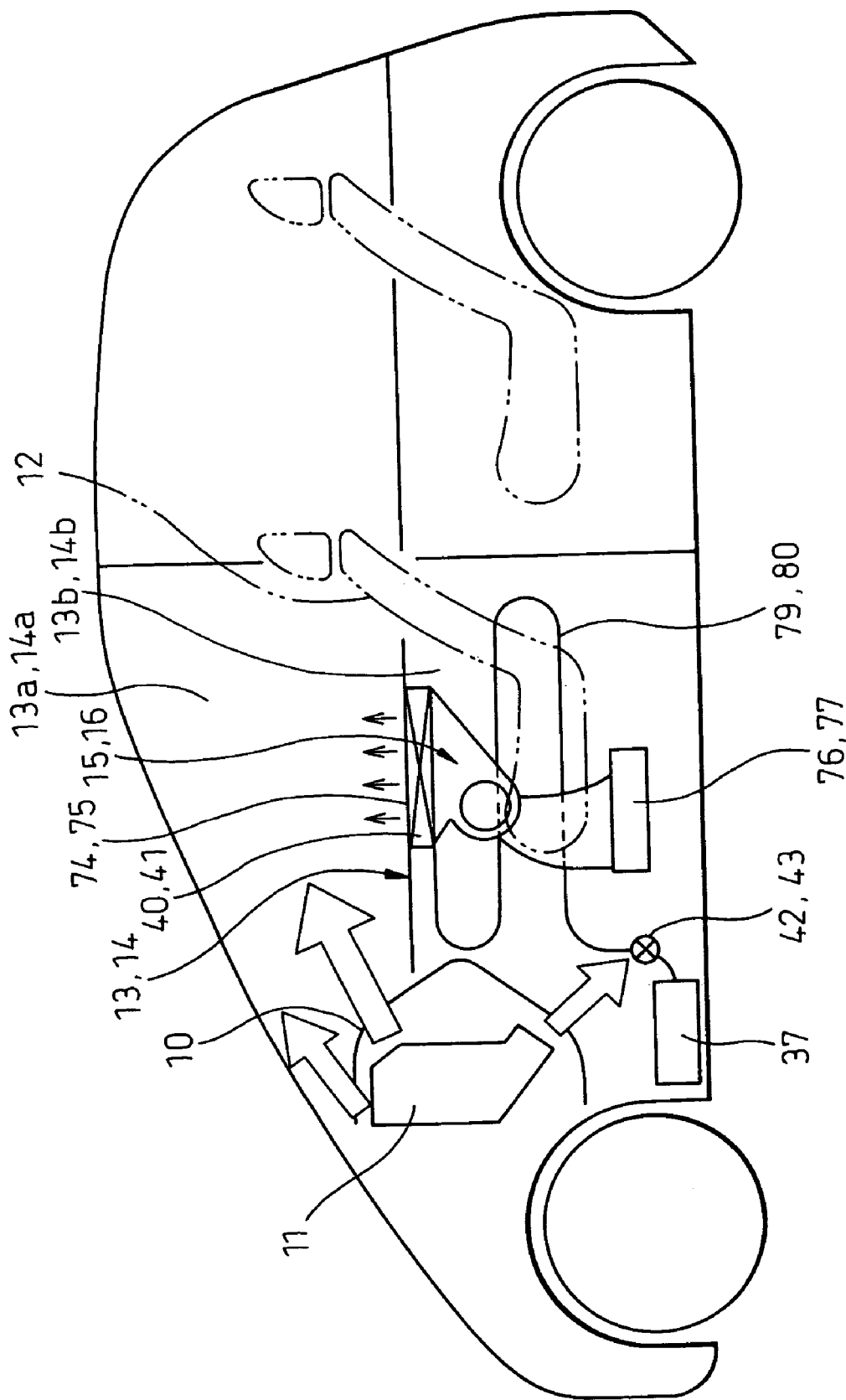
FIG. 1 is a schematic side view showing a vehicle on which an air conditioner for vehicle use of the first embodiment of the present invention is mounted.

First of all, a first embodiment of the present invention will be explained below. FIG. 1 is a schematic side view showing a vehicle on which an air conditioner for vehicle use of the first embodiment of the present invention is mounted. The air conditioning unit 1, which is a primary air conditioning unit, is mounted inside the instrument panel 10 located at the front portion of the vehicle passenger compartment.

On the other hand, the right and left doors arranged on the front seat 12 side, that is, the doors 13, 14 arranged on the driver's seat side and the passenger's seat side include: side windows 13a, 14a arranged in the upper portion; and door bodies 13b, 14b arranged in the lower portion. In these door bodies 13b, 14b, the air conditioning units 15, 16 arranged in the doors, which are auxiliary air conditioning units, are mounted.

In this connection, FIG. 1 is a view showing the vehicle door 13 on the driver's seat side and the air conditioning unit 15 arranged in the door. However, as the vehicle door 14 on the passenger's seat side and the air conditioning unit 16 on the passenger's seat side arranged in the door are composed in the same manner as those on the driver's seat side, reference signs of the components of the vehicle door 14 on the passenger's seat side and the air conditioning unit 16 arranged in the door are also written on FIG. 1. In FIGS. 4, 5 and 6 described later, the reference signs of the components on the passenger's side are also written together with the reference signs of the components on the driver's seat side.

Figure 2:
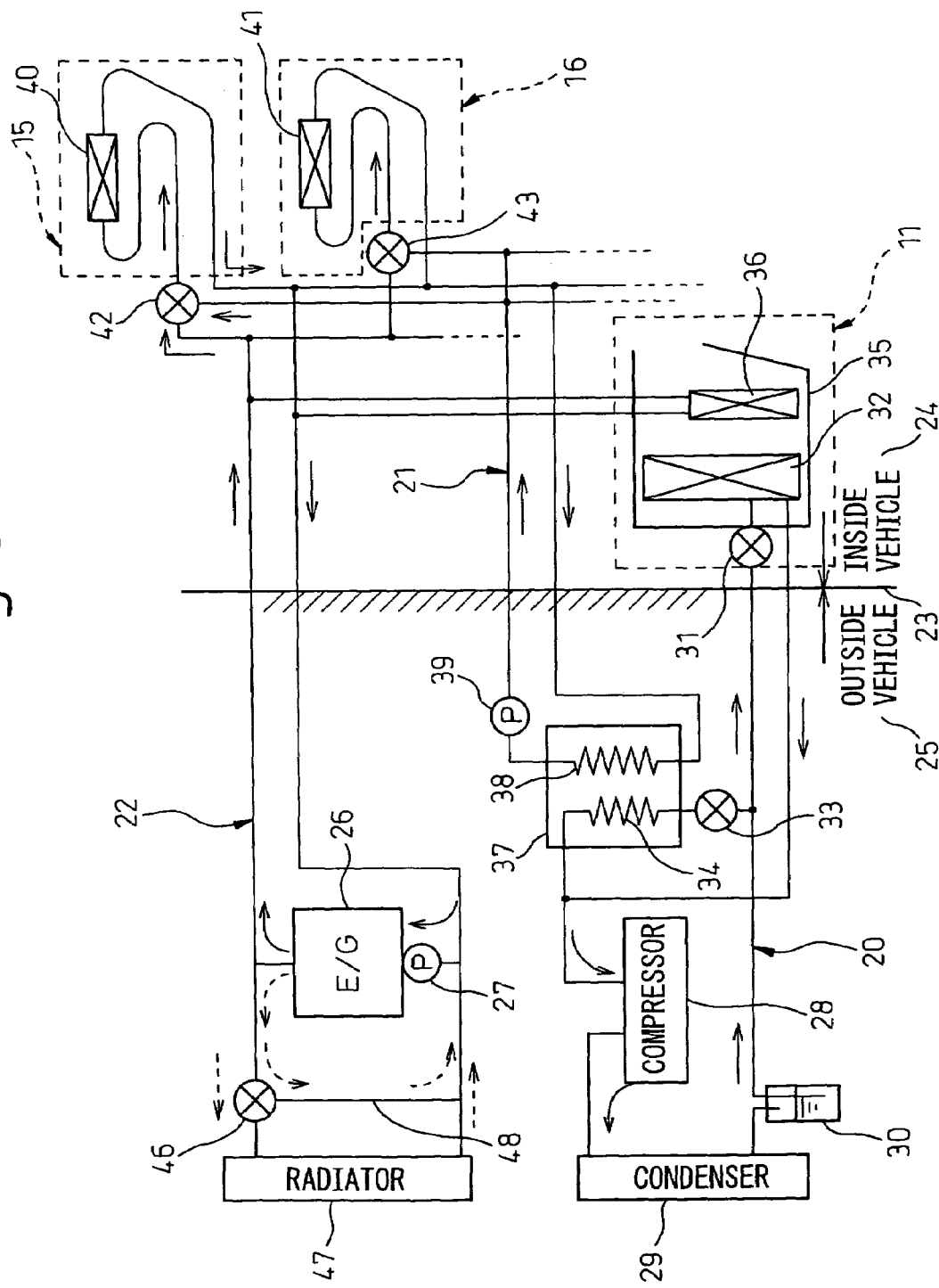
FIG. 2 is a circuit diagram in which the refrigerating cycle, the cold water circuit and the hot water circuit of the first embodiment are combined with each other.

Next, FIG. 2 is a diagram in which the refrigerating cycle 20, the cold water circuit 21 and the hot water circuit 22 of the overall air conditioner for vehicle use of the first embodiment are combined with each other. The partitioning line 23 shows a partitioning portion by which the region 24 inside the vehicle passenger compartment and the region 25 outside the vehicle passenger compartment are partitioned from each other. In this connection, in the circuit diagram shown in FIG. 2, black circles represent branch points or joining points of pipes.

The engine 26 for running of the vehicle is a water-cooled engine, which functions as a hot water supply source incorporated into the hot water circuit 22. The engine 26 for running has a water pump 27 rotated by the engine 26 itself. Hot water (engine coolant) heated in the engine 26 for running is circulated in the hot water circuit 22 by this water pump 27.

The engine 26 for running functions as the drive source for driving the compressor 28 incorporated into the refrigerating cycle 20. The compressor 28 incorporated into the refrigerating cycle 20 is rotated by the engine 26 for running via a power transmission mechanism such as a pulley and belt not shown in the drawing.

In the refrigerating cycle 20, the condenser 29 and the receiver 3, which are well known, are arranged on the discharge side of the compressor 28. On the discharge side of the receiver 30, two expansion valves, that is, the first expansion valve 31 and the second expansion valve 33 are arranged in parallel to each other. On the downstream side of the first expansion valve 31 and the second expansion valve 33, the first evaporator 32 and the second evaporator 34 are arranged in parallel to each other. The discharge side of the first evaporator 32 and the discharge side of the second evaporator 34 are joined to each other and connected to the suction side of the compressor 28.

The first expansion valve 31 and the first evaporator 32 are provided in the air conditioning unit 11 in the instrument panel described before. The first evaporator 32 is arranged in the air conditioning case 35 of the primary air conditioning unit 11. In the air passage formed in this air conditioning case 35, the hot water type heater core 36 is arranged on the downstream side of the first evaporator 32.

In this primary air conditioning unit 11, an air is blown from a blower unit not shown to the upstream portion (the left portion in FIG. 2) of the first evaporator 32. This blower unit blows air while the inside air and the outside air are being changed over. An air blown by this blower unit is cooled by the first evaporator 32 and then passes through the hot water type heater core 36 so that the air is heated.

When a quantity of heat to be used for heating air by the heater core 36 is adjusted by a well known mechanism such as an air mixing door and an adjusting valve for adjusting a flow rate of hot water, the temperature of the blowout air can be adjusted. Air, the temperature of which has been adjusted in this way, is blown out from one of or a plurality of the face blowout port, foot blowout port and defroster blowout port, which are well known, into the vehicle passenger compartment.

On the other hand, the second evaporator 34 is provided in the water-refrigerant heat exchanger 37 which is arranged in the region 25 outside the vehicle passenger compartment. This water-refrigerant heat exchanger 37 exchanges heat between the refrigerant of low pressure of the second evaporator 34 and the water flowing in the water side passage 38, so that the water in the water side passage 38 can be cooled. Cold water cooled here is circulated in the cold water circuit 21 by the electric water pump 39. In this connection, water circulating in this cold water circuit 21 is usually referred to as brine, which is water to which an antifreezing component for lowering the freezing temperature, and a rust prevention component, are added.

In each of the air conditioning units 15, 16 respectively provided in the right and the left door, one heat exchanger 40, 41 for cooling or heating air is provided. As shown in FIG. 1 and FIG. 4 described later, each heat exchanger 40, 41 is formed into an elongated shape, which extends in the longitudinal direction of the vehicle, inside each door body 13b, 14b.

As shown in FIG. 2, in these cooling and heating heat exchangers 40, 41, cold water in the cold water circuit 21 or hot water in the hot water circuit 22 circulates via the cold and hot water changeover valves 42, 43. These cold and hot water changeover valves 42, 43 are three-way valves as exemplarily shown in FIG. 3.

In the specific example shown in FIG. 3, the housing 44 of each cold and hot water changeover valve 42, 43 includes: a cold water inlet 44a into which cold water of the cold water circuit 21 flows; a hot water inlet 44b into which hot water of the hot water circuit 22 flows; and a cold and hot water outlet 44c from which cold water or hot water is taken out. In the housing 44, the columnar valve body 45 is pivotally arranged so that it can be rotated round a rotary axis (not shown) extending in the direction perpendicular to the surface of FIG. 3.

This valve body 45 is rotated by an electric actuator (not shown) such as a motor. The valve body 45 includes a passage hole 45a penetrating through the column in the radial direction. When the rotary position of this passage hole 45a is continuously changed, the communicating state of the cold water inlet 44a and the hot water inlet 44b with the cold and hot water outlet 44c is adjusted.

More particularly, the rotary position of the valve body 45 is continuously adjusted between the first rotary position and the second rotary position. At the first rotary position, the cold water inlet 44a and the cold and hot water outlet 44c are communicated with each other in a fully open state, and the hot water inlet port 44b and the cold and hot water outlet port 44c are shut off from each other (that is, the maximum air conditioning state is provided at the first rotary position.) At the second rotary position, the hot water inlet 44b and the cold and hot water outlet 44c are communicated with each other in a fully open state (that is, the maximum air heating state is provided at the second rotary position.).

Accordingly, when the valve body 45 is rotated to an intermediate position between the first rotary position and the second rotary position, cold water and hot water are mixed with each other in a ratio according to the rotary position of the valve body 45. Therefore, cold and hot water, the temperature of which is determined according to the mixing ratio, flows in the heat exchangers 40, 41 for cooling and heating.

In the hot water circuit, the heat exchangers 40, 41 for cooling and heating are arranged in parallel to the heater core 36 of the air conditioning unit 11 provided in the instrument panel. Therefore, hot water flows from the vehicle engine 26 to the three components 36, 40, 41 in parallel.

In the hot water circuit 22, when the hot water temperature of the vehicle engine 26 is raised to a predetermined temperature, the temperature-responsive valve (thermostat) 46 is opened, and hot water flows from the vehicle engine 26 to the radiator 47 and is cooled. When the hot water temperature of the vehicle engine 26 is lower than a predetermined temperature, the temperature-responsive valve (thermostat) 46 is closed, and hot water flows from the vehicle engine 26 to the bypass passage 48.

Next, the specific structure of the air conditioning units 15, 16 will be described in detail referring to FIGS. 4 and 5. The door bodies 13b, 14b of the vehicle doors 13, 14 form the inner spaces 54, 55 which are provided between the outer plates 50, 51 and the inner plates 52, 53, which are commonly referred to as a door trim panel, while a predetermined interval is set between them. The air conditioning units 15, 16 are arranged in the door bodies 13b, 14b by utilizing these inner spaces 54, 55.

Specifically, in the intermediate portion of each inner space 54, 55 in the vertical direction, the fan 56, 57 is arranged. Each fan 56, 57 includes: a centrifugal fan 58, 59; a motor 60, 61 for driving the fan which is integrally connected to a rotary shaft (not shown) of the centrifugal fan 58, 59 and drives the centrifugal fan 58, 59; and a scroll casing 62, 53, the shape of which is formed into a spiral, for pivotally accommodating the fan 58, 59.

In the inner space 54, 55, the centrifugal fan 58, 59 is arranged in an outer portion (a portion on the outer plate 50, 51 side) in the lateral direction of the vehicle, and the motor 60, 61 is arranged in an inner portion (a portion on the inner plate 52, 53 side) in the lateral direction of the vehicle. Therefore, the rotary shaft (not shown) of the centrifugal fan 58, 59 is arranged in the lateral direction of the vehicle.

As shown in FIGS. 4 and 5, the suction duct 64, 65 and the blowout duct 66, 67 are integrally arranged in the scroll casing 62, 63. The suction duct 64, 65 and the blowout duct 66, 67 are arranged at positions opposite to each other in the circumferential direction of the scroll casing 62, 63.

The scroll casing 62, 63 is pivotally arranged so that it can be rotated round the rotary shaft of the centrifugal fan 58, 59 in the inner space 54, 55 by the electric actuator 68, 69 arranged in the inner space 54, 55. This electric actuator 68, 69 is comprised of an electric motor.

Figure 5A:
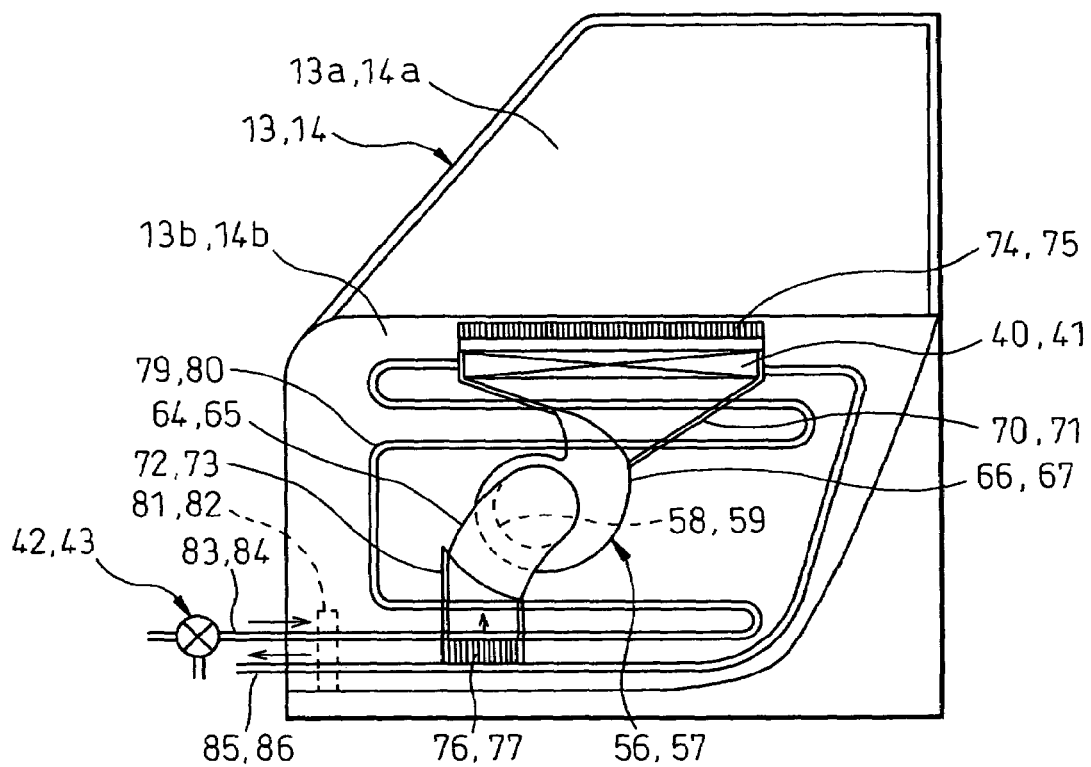
FIG. 5A is a perspective arrangement view showing an air conditioning unit provided inside a door of the first embodiment at the time of air-cooling.
Figure 5B:
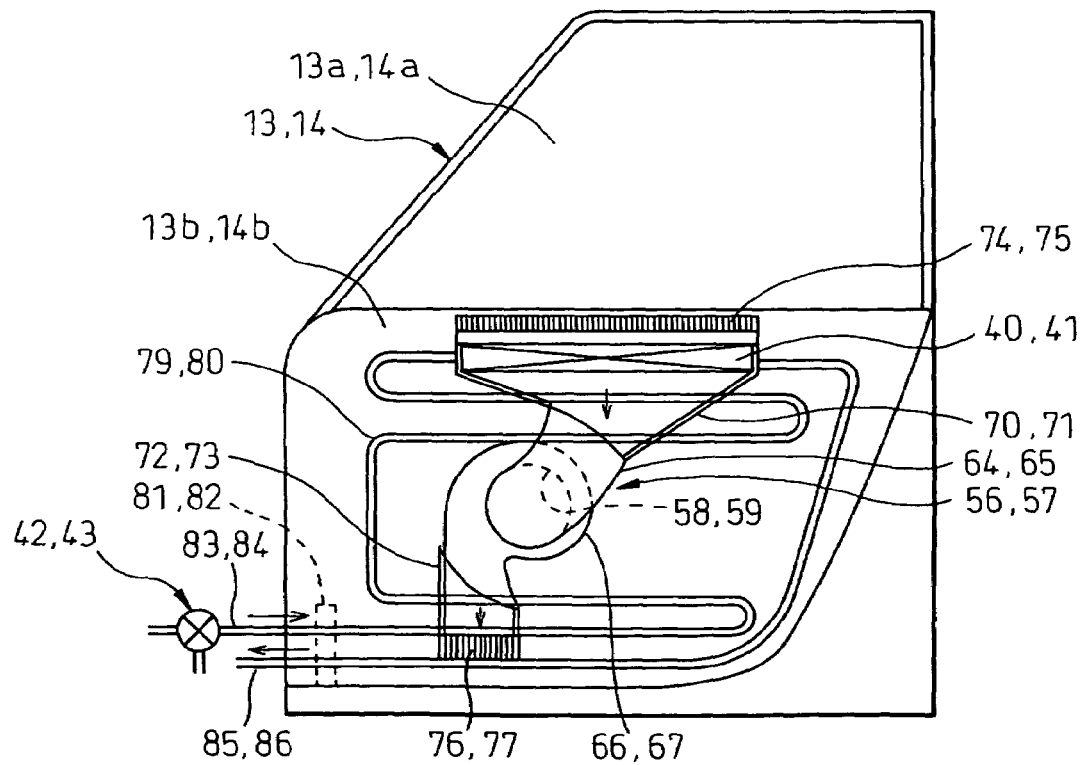
FIG. 5B is a perspective arrangement view showing an air conditioning unit provided inside a door of the first embodiment at the time of air-heating.
Figure 6:
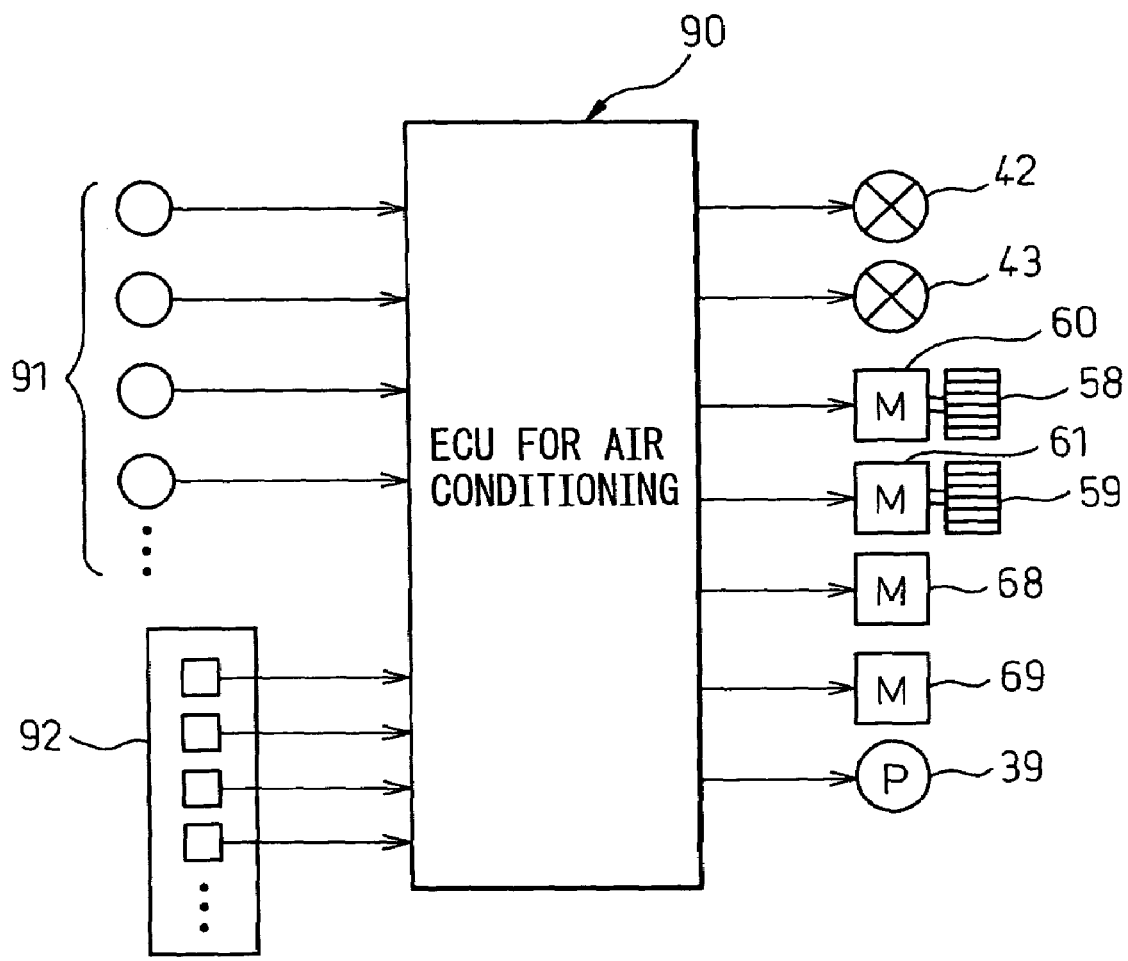
FIG. 6 is an electric control block diagram of the first embodiment.

In this connection, FIGS. 4A and 5A are views showing a rotary position of the scroll casing 60 at the time of air-cooling in summer, and FIGS. 4B and 5B are views showing a rotary position of the scroll casing 60 at the time of air-heating in winter.

In the inner space 54, 55, the upper duct 70, 71 is arranged on an upper side of the fan 56, 57, and the lower duct 72, 73 is arranged on the lower side of the fan 56, 57. Inside the upper duct 70, 71, that is, in the neighborhood of the upper end portion of the door body 13b, 14b, the aforementioned heat exchanger 40, 41 for cooling and heating is arranged. As shown in FIG. 5, this heat exchanger 40, 41 for cooling and heating is formed in such a manner that the height in the vertical direction is small and the shape in the longitudinal direction of the vehicle is elongated.

In the upper duct 70, 71, in an upper portion of the heat exchanger 40, 41 for cooling and heating, that is, in the neighborhood of the upper end portion of the door body 13b, 14b, the upper opening portion 74, 75, which functions as a blowout port at the time of air-cooling and also functions as a suction port at the time of air-heating, is open. This upper opening portion 74, 75 is formed into an elongated shape in the longitudinal direction of the vehicle.

On the other hand, in a lower end portion of the lower duct 72, 73, the lower opening portion 76, 77 is provided which functions as a suction port at the time of air-cooling and also functions as a blowout port at the time of air-heating. As shown in FIG. 4, this lower opening portion 76, 77 is open in a portion on the lower side of the inner plate 52, 53. In this connection, reference numeral 78 shown in FIG. 4 is a floor plate in the vehicle passenger compartment.

As shown in FIGS. 5A, 5B, the cold and hot water pipe 79, 80 for circulating cold and hot water in the heat exchanger 40, 41 for cooling and heating is arranged in the inner space 54, 55 in such a manner that it meanders. As shown in FIGS. 4A, 4B, the cold and hot water pipe 79, 80 is arranged coming into close contact with the inside face of the inner plate 52, 53.

In this connection, in FIGS. 4A, 4B, it is illustrated that only the lower portion of the cold and hot water pipe 79, 80 is closely contacted with the inside face of the inner plate 52, 53. However, actually, substantially the entire cold and hot water pipe 79, 80 is closely contacted with the inside face of the inner plate 52, 53. Due to the foregoing, the cold and hot water pipe 79, 80 and the inner plate 52, 53 are thermally combined with each other. Therefore, the inner plate 52, 53 can be cooled and heated by the cold and hot water flowing in the cold and hot water pipe 79, 80.

As shown in FIGS. 5A, 5B, both end portions of the cold and hot water pipe 79, 80 are arranged in the lower portion on the front side of the door body 13b, 14b. In this lower portion on the front side, the joint portion 81, 82 of the cold and hot water pipe 79, 80 is arranged. As shown in FIG. 5, the aforementioned cold and hot water changeover valve 42, 43 is arranged close to the outside of the door body 13b, 14b.

Both the connecting pipe 83, 84 which is arranged between the cold and hot water changeover valve 42, 43 and the entrance end of the joint portion 81, 82, and the connecting pipe 85, 86, which is connected to the exit end of the joint portion 81, 82, are comprised of a soft pipe capable of being easily deformed.

Due to the foregoing, according to the rotary displacement caused at the time of opening and closing the vehicle door 13, 14, the connecting pipes 83, 84, 85, 86 are softly deformed, and the rotary displacement of the vehicle door 13, 14 is allowed. Accordingly, even if the cold and hot water pipe 79, 80 is built in the vehicle door 13, 14, no problems are caused when the door is opened and closed.

Next, FIG. 6 is an electric control block diagram. The electronic control unit 90 for air conditioning is comprised of a microcomputer and its peripheral circuit. According to a previously set program, a predetermined calculation is conducted, so that various air conditioning devices on the air conditioning unit 11 side provided in the instrument panel and various air conditioning devices on the air conditioning unit 15, 16 side provided in the door can be controlled.

Air conditioning devices on the air conditioning unit 11 side provided in the instrument panel, and its operation control, are the same as those of the prior art. Therefore, the air conditioning device on the air conditioning unit 11 side provided in the instrument panel are omitted in FIG. 6. The cold and hot water changeover valve 42, 43, the motor 60, 61 for driving the fan 56, 57, the electric actuator 68, 69 for driving the scroll casing 62, 63 of the fan 56, 57 and the electric water pump 39 are connected to the output side of the electronic control unit 90 used for air conditioning.

Detection signals of a group of sensors 91 and operation signals of the air conditioning operation panel 92 are inputted into the input side of the electronic control unit 90 for air conditioning. Concerning the group of sensors 91, there are provided an outside air temperature sensor, inside air temperature sensor, temperature sensor of the vehicle engine 26, cold water temperature sensor of the cold water circuit 21, sunshine sensor of the left portion of the vehicle passenger compartment and sunshine sensor of the right portion of the vehicle passenger compartment.

On the air conditioning operation panel 92, in addition to the well known operation switches, the temperature setting switches for setting the temperatures of the air conditioning units 15, 16 are provided in the right and the left door.

Next, an operation conducted in the above constitution will be explained below. According to the thermal load detection signal of the group of sensors 91 and also according to the setting temperature operation signal of the air conditioning operation panel 92, the target blowout temperature of the air conditioning unit 15, 16 provided in the right and the left door is calculated. When this target blowout temperature is lower than a predetermined temperature, the air-cooling mode is set. When the air conditioning mode is set, the electric actuator 68, 69 for driving the scroll casing 62, 63 of the fan 56, 57 is operated, and the scroll casing 62, 63 is rotated to the air-cooling position shown by FIGS. 4A and 5A.

At this air conditioning position, the suction duct 64, 65 of the scroll casing 62, 63 is connected to the lower duct 72, 73, and the blowout duct 66, 67 is connected to the upper duct 70, 71.

Therefore, when the motor 60, 61 for driving the fan 56, 57 is electrified, the fan 58, 59 is rotated. Then, by the air blowing function of the fan 58, 59, the lower opening portion 76, 77 functions as a suction port through which air is sucked from the vehicle passenger compartment. Therefore, air is sucked from the vehicle passenger compartment as shown by arrow E in FIG. 4A.

Due to the foregoing, air in the vehicle passenger compartment is blown to the heat exchanger 40, 41 for cooling and heating by the route of the lower opening portion 76, 77 → the lower duct 72, 73 → the suction duct 64, 65 → the blowout duct 66, 67 → the upper duct 70, 71.

In this case, at the time of air conditioning, the above target blowout temperature becomes lower than the temperature of the air in the vehicle passenger compartment. Therefore, the cold water circulating in the heat exchanger 40, 41 for cooling and heating is adjusted to cold water of a predetermined temperature to obtain the above target blowout temperature. Accordingly, the above air is cooled by the heat exchanger 40, 41 for cooling and heating and becomes a cold air of the above target blowout temperature. This cold air is blown out upward from the upper end portion of the upper duct 70, 71, that is, from the upper opening portion 74, 75 located in the upper end portion of the door body 13b, 14b along the inner face of the side window 13a, 14a as shown by arrow F in FIG. 4A.

Figure 7A:
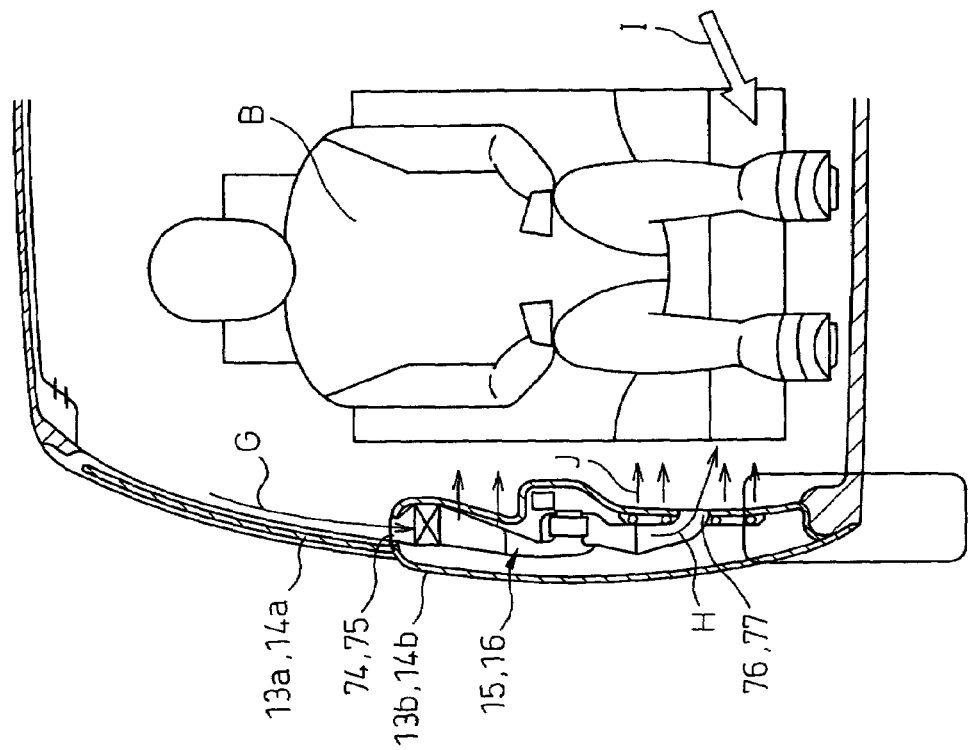
FIG. 7A is a schematic illustration for explaining an effect of enhancement of the thermal comfort of the first embodiment at the time of air-cooling.

FIG. 7A is a view showing a state of the operation at the time of air-cooling. The cold air C is cooled by the air conditioning unit 11, which is provided in the instrument panel, and blown out from the center face blowout port (not shown) formed on the instrument panel 10. The cold air D is cooled by the air conditioning unit 11, which is provided in the instrument panel, and blown out from the side face blowout port (not shown) formed on the instrument panel 10.

As shown in FIG. 7A, in the case where sunshine A is incident on either side of the right or the left in the vehicle passenger compartment via the side window 13a, 14a, the cold air F can be blown out from the upper opening portion 74, 75 to passenger B along a portion on which sunshine A is incident. In the case shown in the drawing, the cold air F can be blown out from the upper opening portion 74, 75 to the right upper half body of passenger B.

The temperature and the quantity of the cold air F can be controlled independently from the cold air C, D. That is, the temperature of the cold air F can be independently controlled by the rotary position control of the cold and hot water changeover valve 42, 43, and the quantity of the cold air F can be independently controlled by the rotating speed control of the fan drive motor 60, 61 for driving the fan 56, 57.

Accordingly, when the cold and hot water changeover valve 42, 43 and the fan drive motor 60, 61 are controlled so that the temperature of the cold air F blown out from the upper opening portion 74, 75 can be lowered according to an increase in the incident quantity of sunshine A and so that the quantity of the cold air can be increased according to an increase in the incident quantity of sunshine A, the discomfort of passenger B, who feels that a portion of the body, on which sunshine A is incident, is hot, can be effectively reduced.

As a result, even when sunshine A is incident on either the right region or the left region in the vehicle passenger compartment via the side window 13*a*, 14*a*, the thermal comfort of passenger B can be remarkably enhanced.

Next, when the target blowout air temperature of the right and left door air conditioning unit 15, 16, which is calculated by the electronic control unit 90 for air conditioning, is increased to a value not less than a predetermined temperature, the heating mode is set. When this heating mode is set, the electric actuator 68, 69 for driving the scroll casing 62, 63 of the blower 56, 57 is operated, and the scroll casing 62, 63 is rotated to the heating position shown in FIGS. 4B and 5B.

At this heating position, the suction duct 64, 65 of the scroll casing 62, 63 is connected to the upper duct 70, 71, and the blowout duct 66, 67 is connected to the lower duct 72, 73.

Therefore, when the drive motor 60, 61 of the fan 56, 57 is energized so as to rotate the fan 58, 59, the upper opening portion 74, 75 functions as a suction port for sucking air from the vehicle passenger compartment by the blowing action of the fan 58, 59. Therefore, air is sucked from the vehicle passenger compartment as shown by arrow G in FIG. 4B.

Due to the foregoing, air in the vehicle passenger compartment passes through the heat exchanger 40, 41 for cooling and heating by the route of the upper opening portion 74, 75 → the upper duct 70, 71 → the suction duct 64, 65 → the blowout duct 66, 67 → the lower duct 72, 73.

In this case, at the time of air-heating, the target blowout air temperature becomes higher than the temperature of the vehicle passenger compartment air. Therefore, the cold and hot water circulating in the heat exchanger 40, 41 for cooling and heating is adjusted to hot water of a predetermined temperature by which the above target blowout air temperature can be obtained.

Accordingly, the above air is heated by the heat exchanger 40, 41 for cooling and heating and becomes a hot air, the temperature of which is the above target blowout temperature. This hot air is blown out from the lower opening portion 76, 77, which is located in a lower end portion of the lower duct 72, 73, to the foot side of passenger B as shown by arrow H in FIGS. 4B and 7B.

Figure 7B:
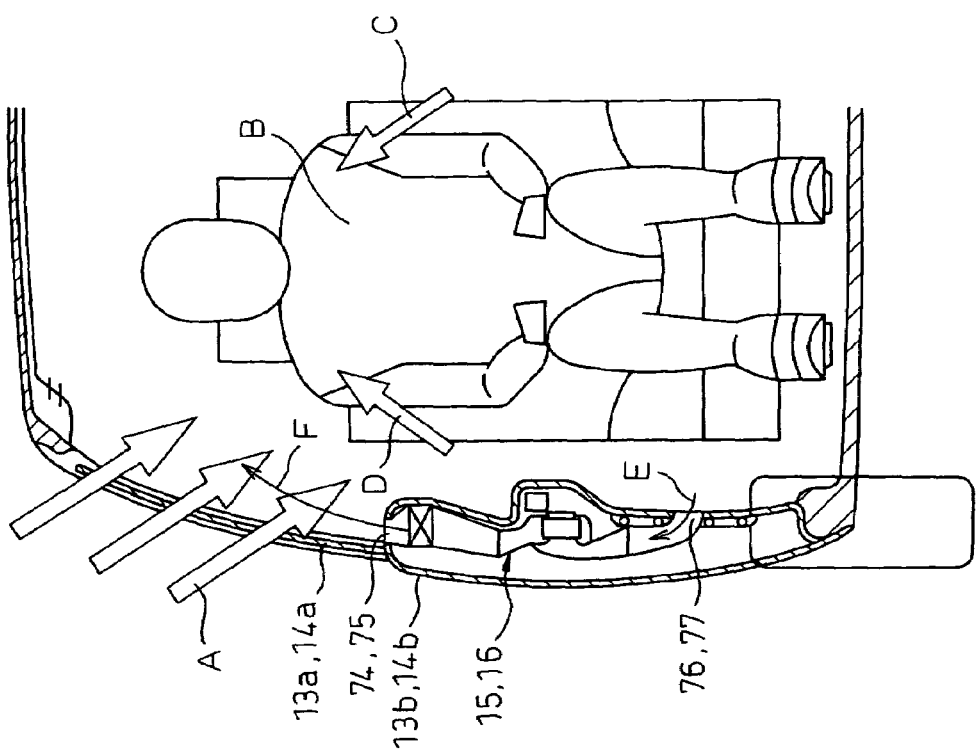
FIG. 7B is a schematic illustration for explaining an effect of enhancement of the thermal comfort of the first embodiment at the time of air-heating.

FIG. 7B is a view showing a state of air-heating conducted as described above. The hot air I is heated by the air conditioning unit 11, which is provided in the instrument panel, and blown out from the foot blowout port (not shown) of the air conditioning unit 11 provided in the instrument panel.

At the time of air-heating in winter, air in the vehicle passenger compartment in the neighborhood of the side window 13*a*, 14*a* is cooled by the side window 13*a*, 14*a* of low temperature. Therefore, the temperature of the air is low.

However, as the upper opening portion 74, 75 acting as the suction port for sucking the air from the vehicle passenger compartment is arranged in the upper end portion of the door body 13*b*, 14*b* and, in other words, as the upper opening portion 74, 75 is arranged at the lower end portion of the side window 13*a*, 14*a*, the above air of low temperature is immediately sucked into the upper opening portion 74, 75 along the inside of the side window 13*a*, 14*a* by the negative suction pressure generated in the upper opening portion 74, 75 as shown by arrow G.

Therefore, it is possible to solve the problems caused by the phenomenon shown in FIG. 25B in which the air of low temperature flows down to the shoulder of passenger B on the side of the side window. In this way, passenger B does not feel cold at the shoulder located on the side of the side window.

Further, substantially all of the cold and hot water pipes 79, 80, in which hot water of high temperature flows, is arranged closely to the inside of the inner plate 52, 53, and the cold and hot water pipe 79, 80 and the inner plate 52, 53 are thermally combined with each other. Therefore, the inner plate 52, 53 is heated by the hot water flowing in the cold and hot water pipe 79, 80, and the surface temperature of the inner plate 52, 53 can be maintained high.

As a result, the foot of the passenger can be heated by the radiant heat transmission (Refer to arrow J shown in FIGS. 4B and 7B.) from the inner plate 52, 53. Accordingly, the foot of the passenger can be heated by both the hot air H and I and the radiant heat transmission from the inner plate 52, 53 in such a manner that the foot of the passenger can be heated.

Due to the foregoing, the problems of the feeling of coldness in the shoulder of passenger B located on the side of the side window can be solved and, further, the entire foot portion of passenger B can be heated so that the foot portion can be covered with heat. Therefore, the thermal comfort at the time of heating can be enhanced.

In this connection, at the time of heating, as a difference between the surface temperature of the inner plate 52, 53 and the vehicle passenger compartment temperature is large, it is possible to expect a heating effect by the radiant heat transmission from the inner plate 52, 53. However, at the time of air-cooling, the difference between the surface temperature of the inner plate 52, 53 and the vehicle passenger compartment temperature is small, the cooling effect obtained by the radiant heat transmission from the inner plate 52, 53 can hardly be expected.

Next, the second embodiment will be explained below. In the first embodiment explained before, the air conditioning unit 15, 16 provided in the door is arranged inside the door body 13*b*, 14*b*. However, in the second embodiment, the air conditioning unit 15, 16 provided in the door is abolished. Instead, the thermal comfort at the time of air-cooling and air-heating can be enhanced by a rear air conditioning unit arranged on the rear side of the rear seat of the vehicle to the same extent as that of the first embodiment.

FIGS. 8A and 9A are schematic arrangement views showing a state in which the entire second embodiment is mounted on a vehicle. FIGS. 8B and 9*b* are sectional views of the vehicle door shown in FIGS. 8A and 9A. FIGS. 8A and 8B show a flow of air at the time of air-cooling in summer, and FIGS. 9A and 9B show a flow of air at the time of air-heating in winter.

In FIGS. 8 and 9, the vehicle doors 13, 14 are rear doors of the vehicle arranged on the right and left of the rear seat 12*a*. In this connection, the second embodiment is applied to a sedan type passenger vehicle. On the rear side of the rear seat 12a of the vehicle, the trunk 94 is provided.

The vehicle door 13, 14 is comprised of a side window 13a, 14a and a door body 13a, 14a arranged below the side window 13a, 14a.

In the same manner as that of the first embodiment, at the upper end portions of the right and left door bodies 13a, 14a, the elongated opening portions 74, 75 are open in the longitudinal direction of the vehicle. At the time of air-cooling in summer shown in FIGS. 8A and 8B, the right and left opening portions 74, 75 act as a blowout port from which the cold air F is blown out. On the other hand, at the time of air-heating in winter shown in FIGS. 9A and 9B, the right and left opening portion 74, 75 act as a suction port from which the vehicle passenger compartment air G is sucked.

These right and left opening portions 74, 75 are connected to one end portions 95a, 96a of the ducts 95, 96 provided in the right and left doors. These ducts 95, 96 provided in the doors are arranged in the spaces 54, 55 formed between the outer plates 50, 51 and the inner plates 52, 53 of the right and left door bodies 13a, 14a. One end portions 95a, 96a of the ducts 95, 96 in the right and left doors are formed into an elongated shape extending in the longitudinal direction of the vehicle along the opening portions 74, 75.

The other end portions of the ducts 95, 96 in the doors are horizontally arranged to the rear side of the vehicle in the spaces 54, 55 and open to the end faces on the rear side of the door bodies 13a, 14a.

Figure 10:
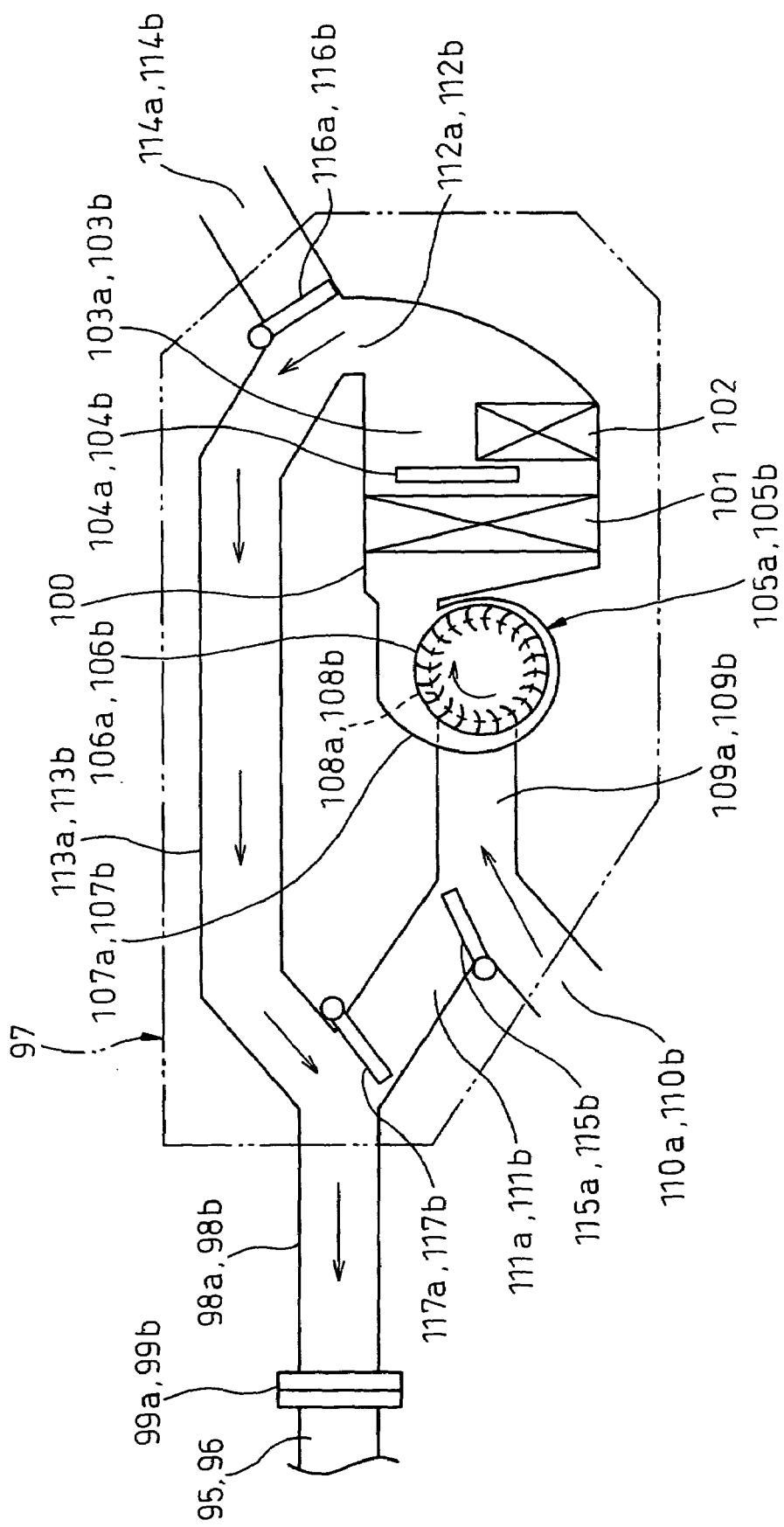
FIG. 10 is a schematic sectional view of the air conditioning unit of the second embodiment at the time of air-cooling.
Figure 11:
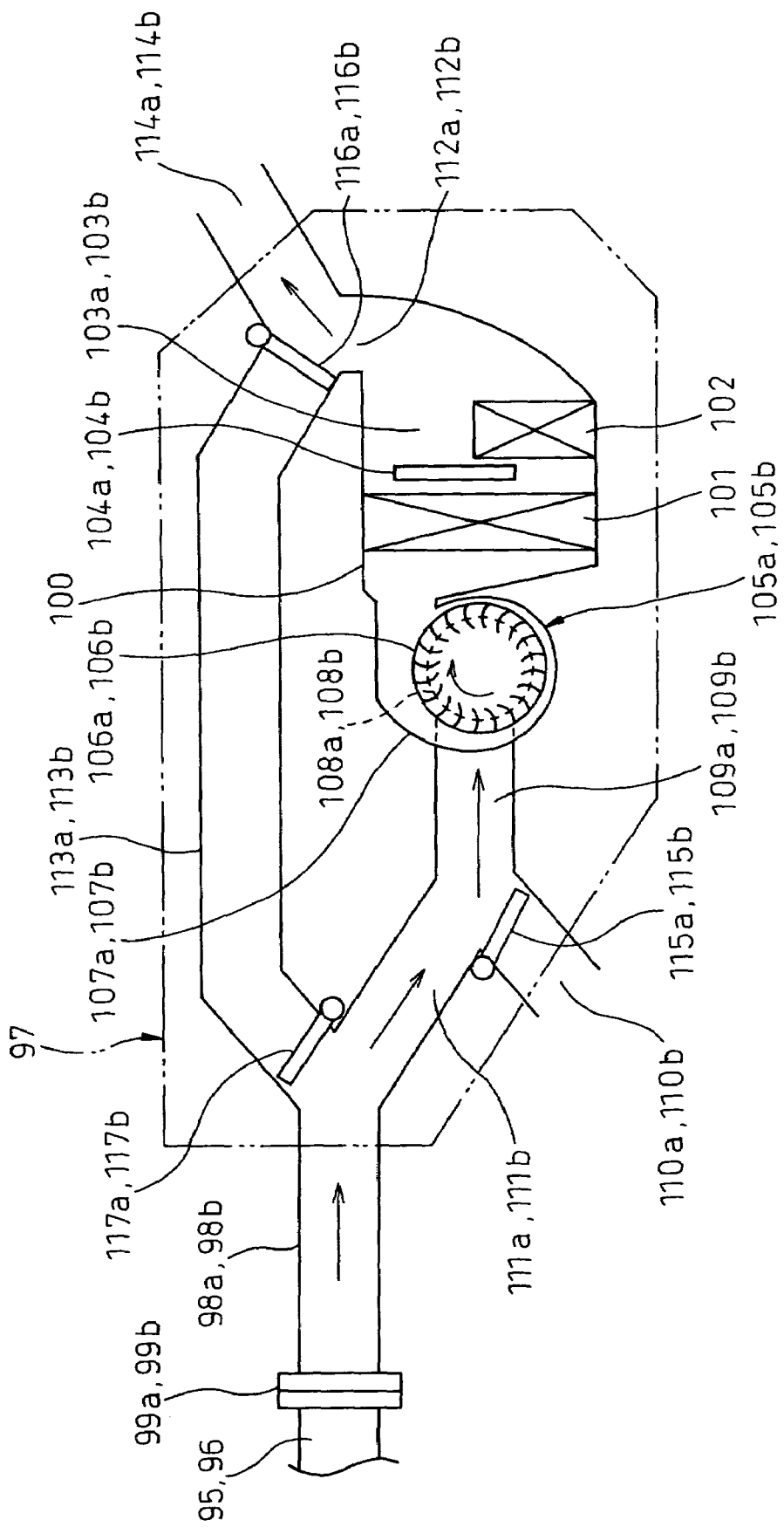
FIG. 11 is a schematic sectional view of the air conditioning unit of the second embodiment at the time of air-heating.

On the other hand, one air conditioning unit 97 is arranged in the trunk room 94. In this air conditioning unit 97, the right and left ducts 98a, 98b, which are provided outside the doors, are arranged in this air conditioning unit 97. These right and left ducts 98a, 98b, which are provided outside the doors, are arranged from the trunk room 94 to the front side of the vehicle. As shown in FIGS. 10 and 11, the end portions the right and left ducts 98a, 98b on the front side of the vehicle are connected to the end portions on the rear side of the ducts 95, 96, which are provided in the doors, of the right and left doors 13, 14.

In this case, when the right and left doors 13, 14 are opened, being linked with this door opening action, the duct connecting portions 99a, 99b separate the inner ducts 95, which are provided in the right and left doors, from the outer duct 98a, 98b which are provided outside the right and left door. Therefore, when the right and left doors 13, 14 are closed, being linked with this door closing action, the duct connecting portions 99a, 99b connect the inner ducts 95, 96, which are provided in the right and left doors, with the outer ducts 98a, 98b which are provided in the right and left doors.

Next, referring to FIGS. 10 to 12, a specific embodiment of the air conditioning unit 97 will be explained below. In this connection, FIG. 10 shows an air flow at the time of air-cooling in summer, and FIG. 11 shows an air flow at the time of air-heating in winter. The air conditioning unit 97 includes an air conditioning case 100 and an air passage is composed inside this air conditioning case 100. In FIGS. 10 and 11, the air passage in the air conditioning case 100 is illustrated as a single passage. However, as shown in FIG. 12, the air passage is actually partitioned into the left passage 100b and the right passage 100c by the central partitioning plate 100a.

Inside the air conditioning case 100, the heat exchanger 101 for cooling is arranged on the upstream side of the air flow, and the heat exchanger 102 for heating is arranged on the downstream side of the air flow of the heat exchanger 101 for cooling. Both the heat exchangers 101 and 102 are respectively arranged over both the right and left passages 100b and 100c.

Specifically, the heat exchanger 101 for cooling is an evaporator incorporated into the refrigerating cycle, and the evaporator cools air by the latent heat of evaporation of the refrigerant. Specifically, the heat exchanger 102 for heating is a hot water type heat exchanger for heating air when the hot water of the vehicle engine is used as a heat source.

As shown in FIGS. 10 and 11, on the side of the heat exchanger 102 for heating, the bypass passage 103a, 103b, in which air flows bypassing the heat exchanger 102 for heating, is formed in the respective right and left passages 100b, 100c.

In the left passage 100b, the left air mixing door 104a is independently provided which adjusts a ratio of the quantity of a cold air passing in the left bypass passage 103a to the quantity of a hot air passing in the left passage in the heat exchanger 102 for heating.

In the right passage 100c, the right air mixing door 104b is independently provided which adjusts a ratio of the quantity of a cold air passing in the right bypass passage 103b to the quantity of a hot air passing in the right passage in the heat exchanger 102 for heating. Accordingly, when the positions of the right and left air mixing doors 104a, 104b are independently controlled, the blowout air temperature on the left and the blowout air temperature on the right of the air conditioning unit 97 can be independently controlled.

In this connection, as a specific example of the right and left air mixing doors 104a, 104b, FIGS. 10 and 11 exemplarily show a sliding type door which slides in the vertical direction in the drawing. The right and left air mixing doors 104 are respectively connected to the right and left actuators (not shown) composed of a motor and others. Therefore, the right and left air mixing doors 104 are respectively operated by these actuators for driving.

As shown in FIG. 12, on the upstream side of the air flow in the heat exchanger 101 for cooling, the centrifugal blowers 105a, 105b are separately arranged. The right and left blowers 105a, 105b have the centrifugal fans 106a, 106b in which a large number of blades are annularly arranged. These fans 106a, 106b are pivotally accommodated in the scroll casings 107a, 107b, the shapes of which are spiral. These fans 106a, 106b are driven by the drive motors not shown.

In each scroll casing 107a, 107b, the fan suction port 108a, 108b is formed on one end side in the axial direction (in the direction perpendicular to the surface of FIGS. 10 to 12) of the fan 106a, 106b. This fan suction port 108a, 108b is respectively connected to one end of each of the right and left suction ducts 109a, 109b. The other end side of the suction duct 109a, 109b is communicated with the vehicle passenger compartment air suction port 110a, 110b and one end of the connection duct 111a, 111b.

In this case, in FIGS. 8 and 9, the vehicle passenger compartment air suction ports 110a, 110b provided on the right and left are open to the vehicle passenger compartment in both side portions in the periphery of the rear seat 12a. The right and left connection ducts 111a, 111b connect the right and left ducts 98a, 98b, which are provided outside the door, with the right and left suction ducts 109a, 109b at the time of air-heating (shown in FIG. 11).

The right and left air blowout opening portions 112a, 112b are formed at the downstream end portion of the air flow of the air conditioning case 100. This left air blowout opening portion 112a is communicated with the inlet portion of the left air blowout duct 113a and the left foot air blowout port 114a. The right air blowout opening portion 112b is communicated with the inlet portion of the right air blowout duct 113b and the right foot blowout port 114b. In FIGS. 8 and 9, the right and left foot air blowout ports 114a, 114b are open to the vehicle passenger compartment on both sides of the foot portion of passenger K in the rear seat.

The first changeover doors 115a, 115b on the right and left change over the passages of the right and left connection ducts 111a, 111b and the vehicle passenger compartment air suction ports 110a, 110b on the right and left. The second changeover doors 116a, 116b on the right and left change over the inlet portions of the right and left air blowout ducts 113a, 113b and the right and left foot blowout ports 114a, 114b. The third changeover doors 117a, 117b on the right and left change over the outlet portions of the right and left air blowout ducts 113a, 113b and the passages of the right and left connection ducts 111a, 111b.

In this embodiment, the first to the third changeover door 115a, 115b to 117a, 117b are composed of a plate door capable of rotating round a rotary shaft. The rotary shafts of the first to the third changeover door 115a, 116a, 117a on the left are connected to the common actuator (not shown) for driving the left via a link mechanism. This common actuator for driving the left operates the first to the third changeover door 115a, 116a, 117a provided on the left.

In the same manner, the rotary shafts of the first to the third changeover door 115b, 116b, 117b on the right are connected to the common actuator (not shown) for driving the right via a link mechanism. This common actuator for driving the right operates the first to the third changeover door 115a, 116a, 117a provided on the right. In this connection, the right and left air mixing doors 104a, 104b are independently operated by the actuators (not shown) for driving the right and left composed of a motor and others.

In this connection, in the second embodiment, the motors for driving the right and left fans 105a, 105b, the actuators for driving the first to the third changeover door 115a, 115b to 117a, 117b on the right and left, and the actuators for driving the right and left air mixing doors 104a, 104b are all controlled by the control unit 90 (shown in FIG. 6) for air conditioning.

Next, the operation of the second embodiment will be explained below. The target air blowout temperatures on the right and left of the air conditioning unit 97 are independently calculated by the control unit 90 for air conditioning. According to these target air blowout temperatures on the right and left, the operating positions of the right and left air mixing doors 104a, 104b are independently controlled so that the air blowout temperature of the right and left passages 100b, 100c of the air conditioning unit 97 can be the right and left target air blowout temperatures.

The air-cooling mode and the air-heating mode are set being changed over by the control unit 90 for air conditioning when the control unit 90 judges whether the right and left target air blowout temperatures are high or low. In this case, the air-cooling mode and the air-heating mode are changed over by the following two systems. One is a system in which the air-cooling mode and the air-heating mode are changed over individually in the left passage 100b of the air conditioning unit 97 and in the right passage 100c. The other is a system in which the air-cooling mode and the air-heating mode are changed over simultaneously in the left passage 100b of the air conditioning unit 97 and in the right passage 100c.

In the former, that is, an individually setting system, it is individually judged whether the right and left target air blowout temperatures are high or low, and the air-cooling mode is set in the passage, which is one of the right and left passages 100b, 100c, the target air blowout temperature of which is lower than a predetermined temperature, and the air-heating mode is set in the passage, which is the other of the right and left passages 100b, 100c, the target air blowout temperature of which is higher than the predetermined temperature.

In the latter, that is, a simultaneously setting system, the average of the right and left target air blowout temperatures is calculated. When the average of the right and left target air blowout temperatures is lower than the predetermined temperature, the right and left passages 100b, 100c are simultaneously set at the air-cooling mode. When the average of the right and left target air blowout temperatures is higher than the predetermined temperature, the right and left passages 100b, 100c are simultaneously set at the air-heating mode.

In order to simplify the explanation, the simultaneously setting system will be explained as follows. When the average of the right and left target air blowout temperatures is lower than the predetermined temperature and the right and left passages 100b, 100c are set at the air-cooling mode, the actuators for driving the first to the third changeover doors 115a, 115b to 117a, 117b on the right and left are controlled by the control output of the control unit 90 for air conditioning. Therefore, the first to the third changeover door 115a, 115b to 117a, 117b are driven to the operating positions shown in FIG. 10.

Accordingly, the suction ducts 109a, 109b of the right and left fans 105a, 105b are communicated with the right and left vehicle passenger compartment air suction ports 110a, 110b. Further, the right and left air blowout ducts 113a, 113b are communicated with the right and left ducts 98a, 98b provided outside the door. Therefore, when the motors (not shown) for driving the blowers 105a, 105b are energized and the fans 106a, 106b are rotated, the vehicle passenger compartment air is sucked from the vehicle passenger compartment air suction ports 110a, 10b and sent into the air conditioning case 100.

This air passes through the heat exchanger 101 for cooling and becomes a cold air. At the time of air-cooling, the right and left air mixing doors 104a, 104b increase the opening degrees of the bypass passages 103a, 103b and decrease the opening degree of the passage on the side of the heat exchanger 102 for heating. Therefore, the above cold air mainly passes in the bypass passages 103a, 103b and flows into the right and left air blowout opening portions 112a, 112b. As shown in FIGS. 8A, 8B and 10, this cold air passes in the route of the right and left air blowout ducts 113a, 113b → the right and left ducts 98a, 98b provided outside the door → the right and left ducts 95, 96 provided inside the door and reaches the opening portions 74, 75 of the door bodies 13a, 13b. The cold air blows out from the opening portions 74, 75 along the inner faces of the side window 13a, 14a as shown by arrow F.

In this case, in the air conditioning unit 97, the air blowout temperatures of the right and left passages 100b, 100c can be independently controlled by the right and left air mixing doors 104a, 104b. The quantities of air blown out from the right and left passages 100b, 100c can be independently controlled by controlling the rotating speeds of the right and left blowers 105a, 105b.

As shown in FIG. 13A, in the case where sunshine A passes through the right side window 14a and is directly incident on the right upper half body of passenger K in the rear seat, according to the increase in the quantity of incident sunshine A, the air blowout temperature of the right passage 100c is controlled to the lower temperature side, and the rotating speed of the right blower 105b is controlled to the higher speed side so as to increase the quantity of air to be blown out.

Due to the foregoing, a sufficiently large quantity of cold air of a sufficiently low temperature can be blown out from the opening portion 75 of the upper end portion of the right door body 14b to the periphery of the portion of passenger K on which sunshine A is directly incident. Due to the foregoing, problems of the feeling of the heat, which is caused by sunshine A passing through the side window 13a, 14a and directly incident on passenger K at the time of air-cooling, can be effectively solved. Therefore, thermal comfort can be enhanced at the time of air-cooling.

Next, an explanation will be made into a case in which the average of the right and left target air blowout temperatures exceeds a predetermined temperature and the air-heating mode is set. At this time of air-heating, by the control output of the control unit 90 for air conditioning, the actuator for driving the first to the third changeover doors 115a, 115b to 117a, 117b is controlled, and the first to the third changeover door 115a, 115b to 117a, 117b are driven to the operating positions shown in FIG. 11.

Accordingly, the suction ducts 109a, 109b of the right and left fans 105a, 105b are communicated with the right and left connection ducts 111a, 111b. The connection ducts 111a, 111b are communicated with the opening portions 74, 75 via the route of the right and left ducts 98a, 98b provided outside the door → the right and left ducts 95, 96 provided inside the door. The right and left air blowout opening portions 112a, 112b of the air conditioning case 100 are communicated with the right and left foot air blowout ports 114a, 114b.

Therefore, when the motors (not shown) for driving the blowers 105a, 105b are energized and the fans 106a, 106b are rotated, the vehicle passenger compartment air is sucked from the opening portions 74, 75 in the upper end portions of the door bodies 13b, 14b. As a result, air is sucked from the vehicle passenger compartment into the opening portions 74, 75 as shown by arrow G.

Thus sucked air passes through the above route and is sent into the air conditioning case 100. At the time of air-heating, the right and left air mixing doors 104a, 104b increase the opening degree of the passage on the side of heat exchanger 102 for heating and decrease the opening degrees of the bypass passages 103a, 103b. Therefore, the air passes through the heat exchanger 101 for cooling and then passes through the passage of the heat exchanger 102 for heating. Therefore, the air is heated and becomes a hot air.

As shown in FIG. 11, this hot air passes through the right and left air blowout opening portions 112a, 112b and blows out from the right and left foot air blowout ports 114a, 114b to the foot portion of passenger K in the rear seat.

At the time of air-heating in winter, as shown by arrow G in FIG. 13B, the vehicle passenger compartment air of low temperature, which has been cooled by the side windows 13a, 14a of low temperature, can be immediately sucked along the inside of the side windows 13a, 14a into the opening portions 74, 75 in the upper end portions of the door bodies 13b, 14b.

Accordingly, it is possible to solve the problems caused by the phenomenon in which the air of low temperature flows down to the shoulder of passenger K on the side of the side window. In this way, passenger K does not feel cold at the shoulder located on the side of the side window. Therefore, it is possible to enhance the thermal comfort at the time of air-heating. In this connection, in FIG. 13B, arrow I shows a hot air blowing out from the foot blowout port 114a, 114b.

As can be understood from the above explanations, according to the second embodiment, the thermal comfort at the time of air-cooling and air-heating can be enhanced by using the air conditioning unit 97 provided outside the vehicle doors 13, 14. Therefore, the structure of mounting the air conditioner on a vehicle according to the second embodiment can be made simple compared with the structure of the first embodiment.

Next, the third embodiment will be explained below. In the second embodiment, the opening portion 74, 75 is arranged at an upper end portion of the door body 13b, 14b. However, in the third embodiment, as shown in FIG. 14, the opening portion 74, 75 is arranged in an upper region of the inner plate 52, 53 of the door body 13b, 14b.

As shown in FIG. 14A, this opening portion 74, 75 is formed into a shape extending in the longitudinal direction of the vehicle. As shown in FIG. 14B, inside the opening portion 74, 75, a plurality of air guide plates 74a, 75a, which guide an air obliquely upward, are arranged. Due to the foregoing, at the time of air-cooling in summer, an air blown out from the opening portion 74, 75, that is, a cold air can be guided obliquely upward as shown by arrow F and blown out to the upper half portion of the passenger on the side of the side window.

At the time of air-heating in winter, air in the vehicle passenger compartment of low temperature, which has been cooled by the side window 13a, 14a of low temperature, can be sucked into the opening portion 74, 75 as shown by arrow G.

In this connection, the third embodiment is another embodiment with respect to the second embodiment. However, the following constitution may be employed. In the first embodiment, the upper opening portion 74, 75 may not be arranged in an upper end portion of the door body 13b, 14b but may be arranged in an upper region of the inner plate 52, 53 of the door body 13b, 14b in the same manner as that of the third embodiment.

Next, the fourth embodiment will be explained below. The fourth embodiment is a variation on the first embodiment. Different points of the fourth embodiment from the first embodiment will be explained referring to FIGS. 15 to 20.

In the first embodiment, the centrifugal blower 56, 57 having the centrifugal fan 58, 59 is used for the blower incorporated into the air conditioning unit 15, 16 provided in each of the right and left doors. When the scroll casing 62, 63 of this centrifugal blower 56, 57 is rotated, the sucking direction and the blowing direction of the centrifugal blower 56, 57 can be changed over in the opposite direction at the time of air-cooling and air-heating. However, in the fourth embodiment, the blower 560, 570 having the cross flow fan 561, 571, in which air passes through in a cross section perpendicular to the axial direction of the fan, is used for the air conditioning unit 15, 16 provided in each of the right and left doors. When the rotary direction of this cross flow fan 561, 571 is changed over in the opposite direction at the time of air-cooling and air-heating, the sucking direction and the blowing direction of the blower 560, 570 can be changed over in the opposite direction at the time of air-cooling and air-heating.

The changeover mechanism for changing over the sucking direction and the blowing direction of the blower in the fourth embodiment will be specifically explained below.

Figure 15:
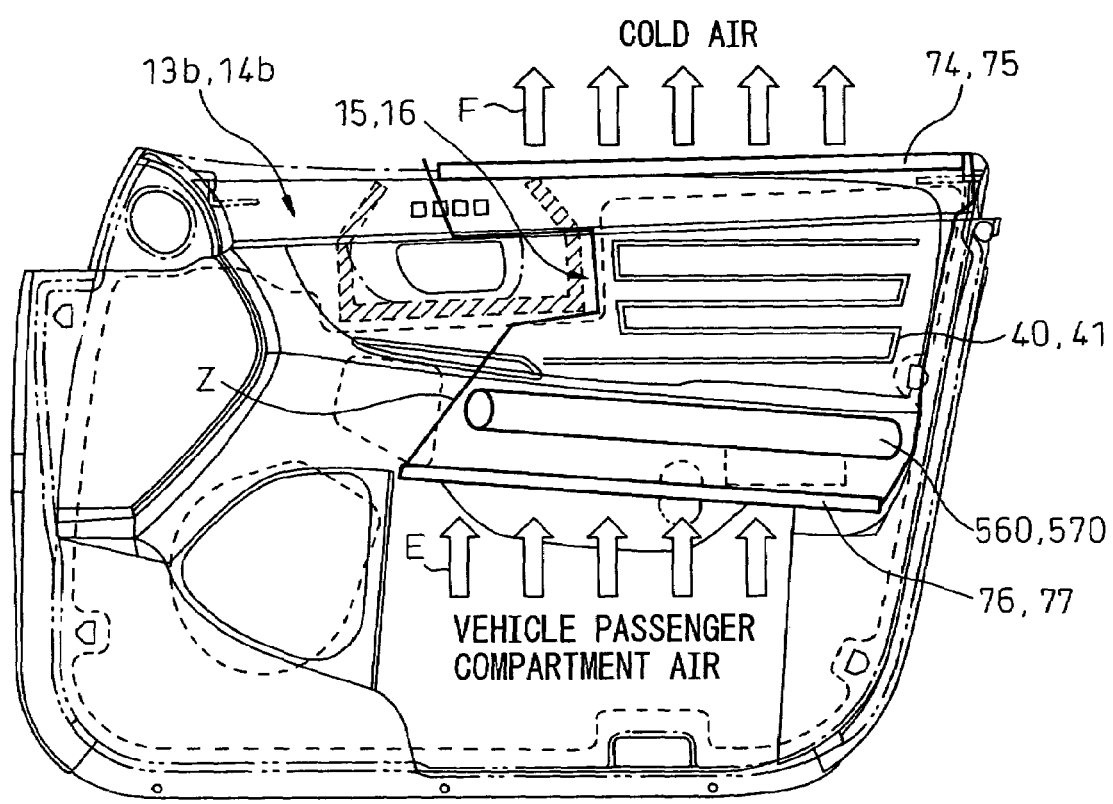
FIG. 15 is a schematic front view of a vehicle door portion showing an air conditioning unit of the fourth embodiment at the time of air-cooling.
Figure 16:
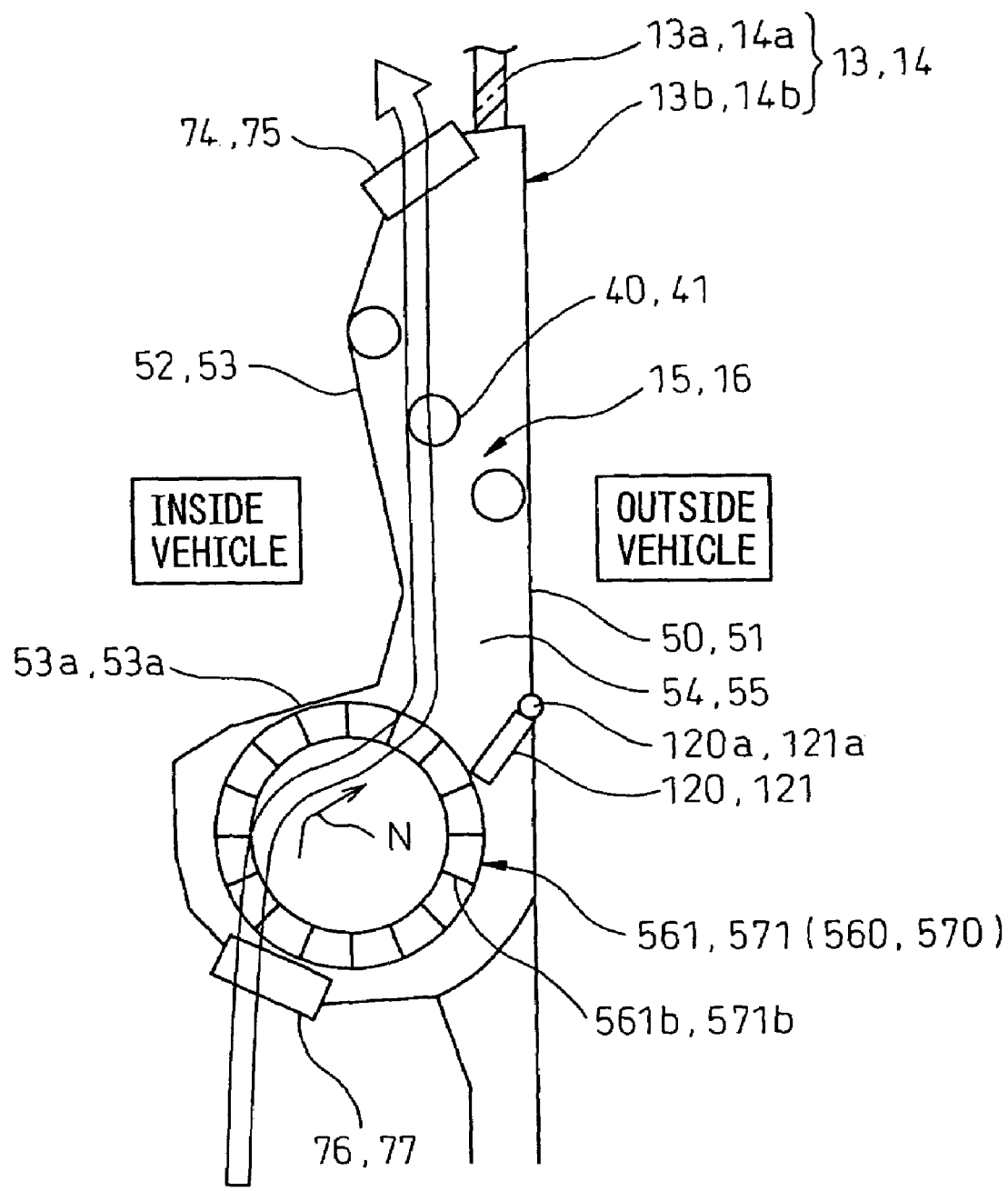
FIG. 16 is a schematic sectional view of a vehicle door portion showing an air conditioning unit of the fourth embodiment at the time of air-cooling.
Figure 17:
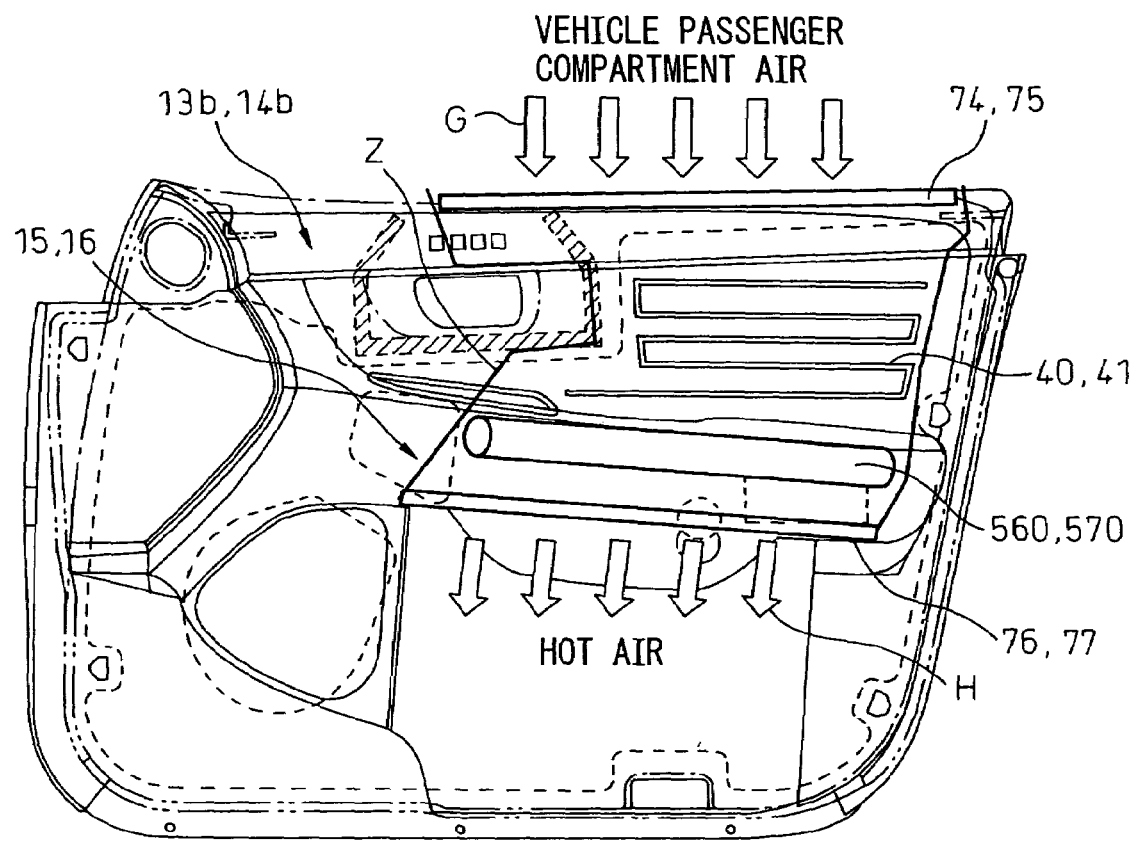
FIG. 17 is a schematic front view of a vehicle door portion showing an air conditioning unit of the fourth embodiment at the time of air-heating.
Figure 18:
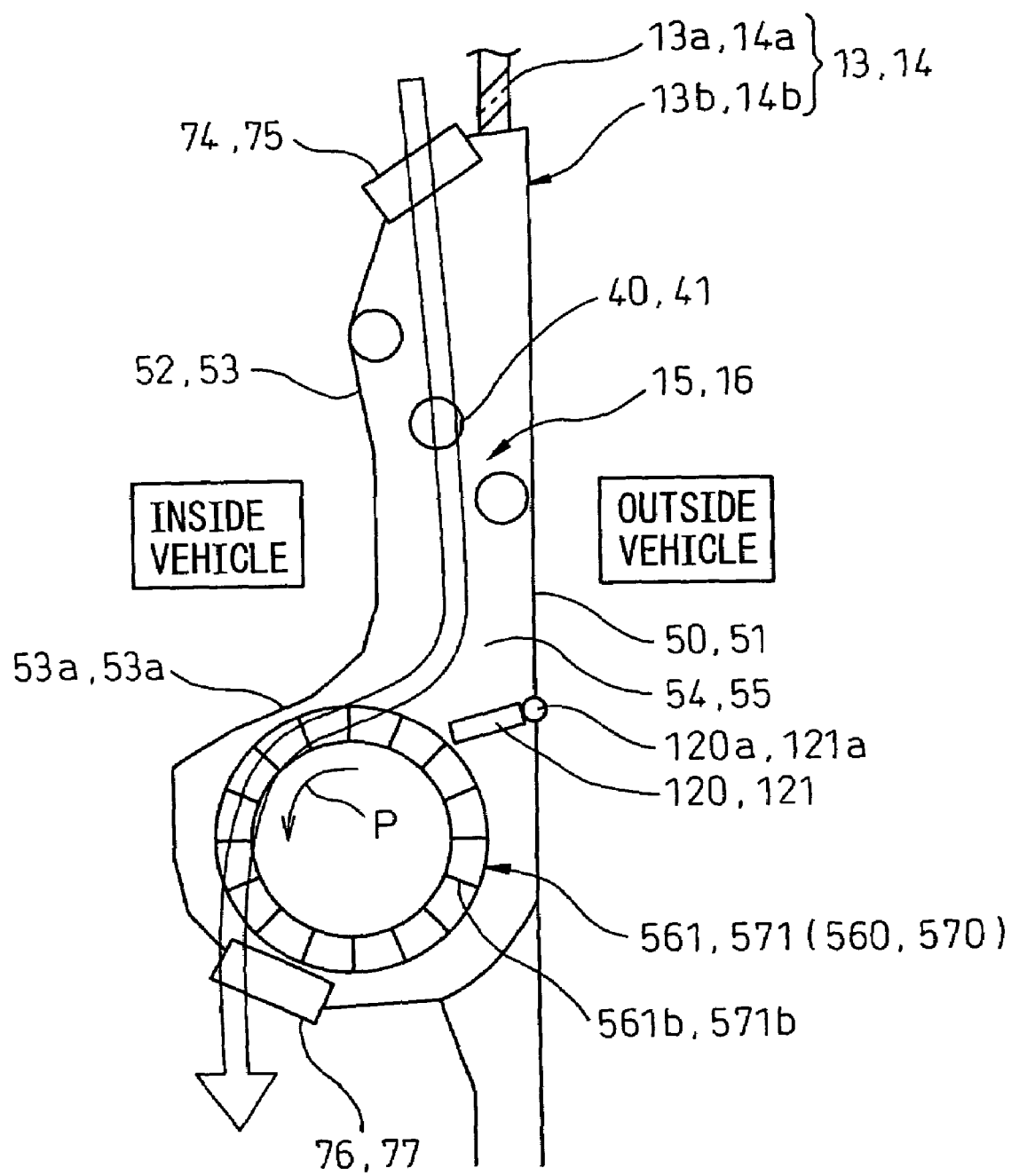
FIG. 18 is a schematic sectional view of a vehicle door portion showing an air conditioning unit of the fourth embodiment at the time of air-heating.
Figure 19:
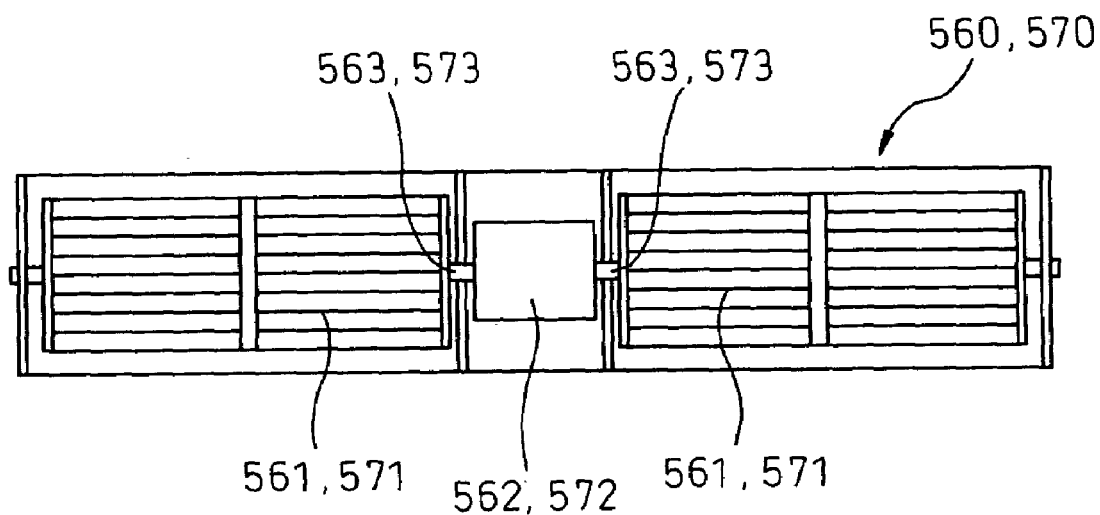
FIG. 19 is a front view showing a cross flow fan used for the fourth embodiment.

FIGS. 15 and 16 are views showing a flow of air at the time of air-cooling in summer in the fourth embodiment. FIGS. 17 and 18 are views showing a flow of air at the time of air-heating in winter in the fourth embodiment. FIG. 19 is a front view showing a single body of the blower 560, 570.

On the inner plate 52, 53 of the door body 13*b*, 14*b* of the door 13, 14 of the vehicle, the arm rest portion 52*a*, 53*a* protruding convexly to the inside of the vehicle passenger compartment is integrally formed. In the fourth embodiment, attention is paid to the existence of this arm rest portion 52*a*, 53*a*, and the blower 560, 570 having the cross flow fan 561, 571 is arranged inside the convex arm rest portion 52*a*, 53*a*.

In this case, the arm rest portion 52*a*, 53*a*, the shape of which is a convex shape, is formed being extended in the longitudinal direction of the vehicle. Therefore, the blower 560, 570 is arranged inside the arm rest portion 52*a*, 53*a* in such a manner that the axial direction of the blower 560, 570 is extending in the longitudinal direction of the vehicle. In this connection, in FIGS. 15 and 17, bold solid line Z indicates a range of the air passage formed by the inner space 54, 55 (shown in FIGS. 16 and 18) of the door body 13*b*, 14*b*. Therefore, the range indicated by solid line Z shows a setting range in which the air conditioning unit 15, 16 provided in the door is set.

As shown in FIG. 19, the blower 560, 570 is composed as follows. The motor 562, 572 for driving is arranged at the center in the axial direction of the fan (the longitudinal direction of the vehicle). The rotary shaft 563, 573 of this motor 562, 572 for driving is protruded to both sides in the axial direction. To the rotary shaft 563, 573 on both sides, the cross flow fan 561, 571 is integrally connected.

Figure 20:
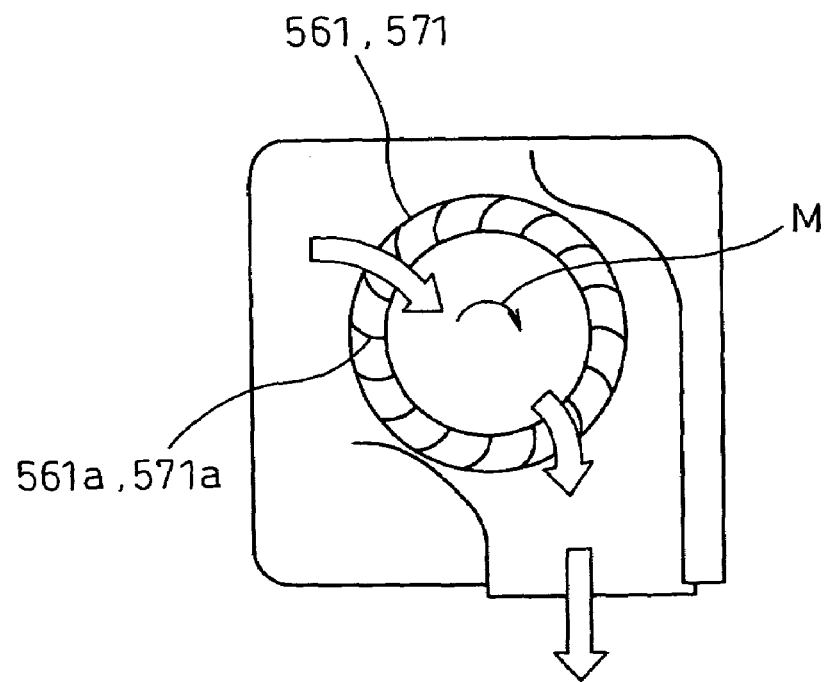
FIG. 20 is a sectional view of a common cross flow fan.

Blades 561*a*, 571*a* of the impeller composing the cross flow fan 561, 571 are usually formed into a curved shape as shown in FIG. 20. Therefore, the rotary direction (the air blowing direction) of the cross flow fan 561, 571 is restricted to only one direction shown by arrow M in FIG. 20.

Therefore, in the fourth embodiment, the blades 561*b*, 571*b* of the impeller composing the cross flow fan 561, 571 are formed into a linear shape extending radially in the radial direction of the fan as shown in FIGS. 16 and 18.

The movable guide member (the stabilizer) 120, 121 is arranged in an upper portion of the cross flow fan 561, 571 on the side of the outer plate 50, 51 of the door body 13*b*, 14*b*. This movable guide member 120, 121 is composed of a plate door capable of rotating round the rotary shaft 120*a*, 121*a* and guides an air flow in the passage of an air blown out from the cross flow fan 561, 571. An actuator for driving such as a motor is connected to the rotary shaft 120*a*, 121*a* of this movable guide member 120, 121, and the operating position of the movable guide member 120, 121 is changed over between the positions shown in FIGS. 16 and 18.

According to the fourth embodiment, at the time of air-cooling in summer, as shown in FIG. 16, the cross flow fan 561, 571 is rotated by the motor 562, 572 for driving in the direction shown by arrow N (clockwise in FIG. 16). At the same time, the movable guide member 120, 121 is operated to a position close to the outer plate 50, 51 shown in FIG. 16.

Due to the foregoing, the cross flow fan 561, 571 sucks air from the vehicle passenger compartment into the lower opening portion 76, 77 of the door body 13*b*, 14*b*. The thus sucked air is blown out to an upper portion of the inner space 54, 55 of the door body 13*b*, 14*b*. At this time, the movable guide member 120, 121 smoothly guides an air blown out from the cross flow fan 561, 571 to an upper portion along the outer plate 50, 51. This air flowing upward passes through gaps formed between the tubes 40, 41 of the heat exchanger 40, 41 for cooling and heating.

As described before, at the time of air-cooling, cold water is circulating in the tubes of the heat exchanger 40, 41 for cooling and heating. Therefore, the air in the inner space 54, 55 is cooled to a cold air by the heat exchanger 40, 41 for cooling and heating. This cold air is blown out upward from the upper opening portion 74, 75 of the door body 13*b*, 14*b* into the vehicle passenger compartment along the inner face of the side window 13*a*, 14*a*.

On the other hand, at the time of air-heating in winter, as shown in FIG. 18, the motor 562, 572 for driving is reversed, and the cross flow fan 561, 571 is rotated in the reverse direction P (counterclockwise in FIG. 18). At the same time, the movable guide member 120, 121 is operated to a position shown in FIG. 18 at which the movable guide member 120, 121 is perpendicularly protruded from the outer plate 50, 51.

Due to the foregoing, the cross flow fan 561, 571 sucks air from the vehicle passenger compartment into the upper opening portion 74, 75 of the door body 13*b*, 14*b*, and the thus sucked air is blown to a lower portion of the inner space 54, 55 of the door body 13*b*, 14*b* and made to pass through the gaps formed between the tubes of the heat exchanger 40, 41 for cooling and heating.

As described before, at the time of air-heating, as hot water is circulating in the tubes of the heat exchanger 40, 41 for cooling and heating, an air in the inner space 54, 55 is heated to be hot air by the heat exchanger 40, 41 for cooling and heating. This hot air is blown out from the lower opening portion 76, 77 of the door body 13*b*, 14*b* to the foot side of the passenger in the vehicle passenger compartment. More particularly, this hot air is blown out to the neighborhood of the knee of the passenger.

As shown in FIG. 18, when the movable guide member 120, 121 is operated to a position at which the movable guide member 120, 121 is substantially perpendicularly protruding from the outer plate 50, 51, that is, when the movable guide member 120, 121 is operated to a position which is an obliquely lower position by a minute angle compared with the horizontal position, the air passing through the cross flow fan 561, 571 can be guided toward the lower opening portion (the blowout port) 76, 77 along the inner wall face of the arm rest portion 52*a*, 53*a* as shown by the arrow in the drawing.

Even in the fourth embodiment, when a flow of air flowing in the door is changed over at the time of air-cooling and air-heating in the same manner as that of the first embodiment, the thermal comfort can be enhanced at both the time of air-cooling and air-heating. Simultaneously, when the blowout air in the vehicle passenger compartment is cooled and heated (temperature adjustment) by the heat exchanger 40, 41 for cooling and heating, the inner plate 52, 53 of the door body 13*b*, 14*a* can be cooled and heated (temperature adjustment). Due to the foregoing, the comfort of the passenger can be further enhanced.

Further, in the fourth embodiment, the cross flow fan 561, 571, the diameter of which is smaller than that of the centrifugal fan 58, 59 of the first embodiment and the axial direction length of which is longer than that of the centrifugal fan 58, 59, is used for the blower 560, 570 of the air conditioning unit 15, 16 provided in the door. Therefore, as shown in FIGS. 16 and 18, the shape of the cross flow fan 561, 571 is appropriate when the cross flow fan 561, 571 is accommodated in the convex shape of the arm rest portion 52*a*, 53*a*, that is, the shape of the cross flow fan 561, 571 is appropriate when the cross flow fan 561, 571 is accommodated in the elongated convex inner space which extends in the longitudinal direction of the vehicle.

Accordingly, the blower 560, 570 can be easily mounted inside the door body 13*b*, 14*b* while the remodeling of the door body 13*b*, 14*b* is suppressed.

In this connection, in the fourth embodiment, the tube of the heat exchanger 40, 41 for cooling and heating is comprised of a flexible resin tube, and spiral fins are bonded and fixed to an outer circumferential face of the resin tube.

According to the constitution of the heat exchanger described above, since the resin tube is highly flexible, the shape of the heat exchanger can be easily set corresponding to the form of the complicated inner space 54, 55 inside the door body 13*b*, 14*b*. As a result, the heat exchanger can be easily mounted in the door body 13*b*, 14*b*.

Next, the fifth embodiment will be explained below. The fifth embodiment is related to improvements in the structure of the fourth embodiment by which the cooling and heating action (the temperature adjustment) for cooling and heating the inner plate 52, 53 of the door body 13*b*, 14*b* is improved.

Figure 22A:
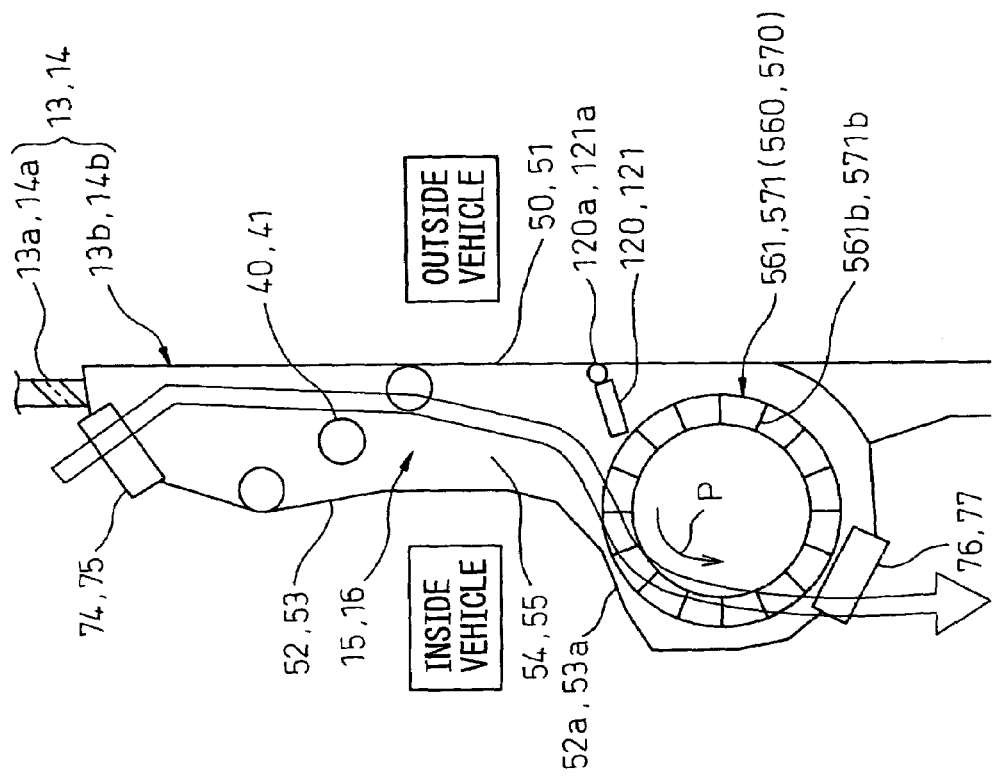
FIG. 22A is a schematic sectional view of a vehicle door portion showing an air conditioning unit of the fifth embodiment at the time of air-heating.
Figure 22B:
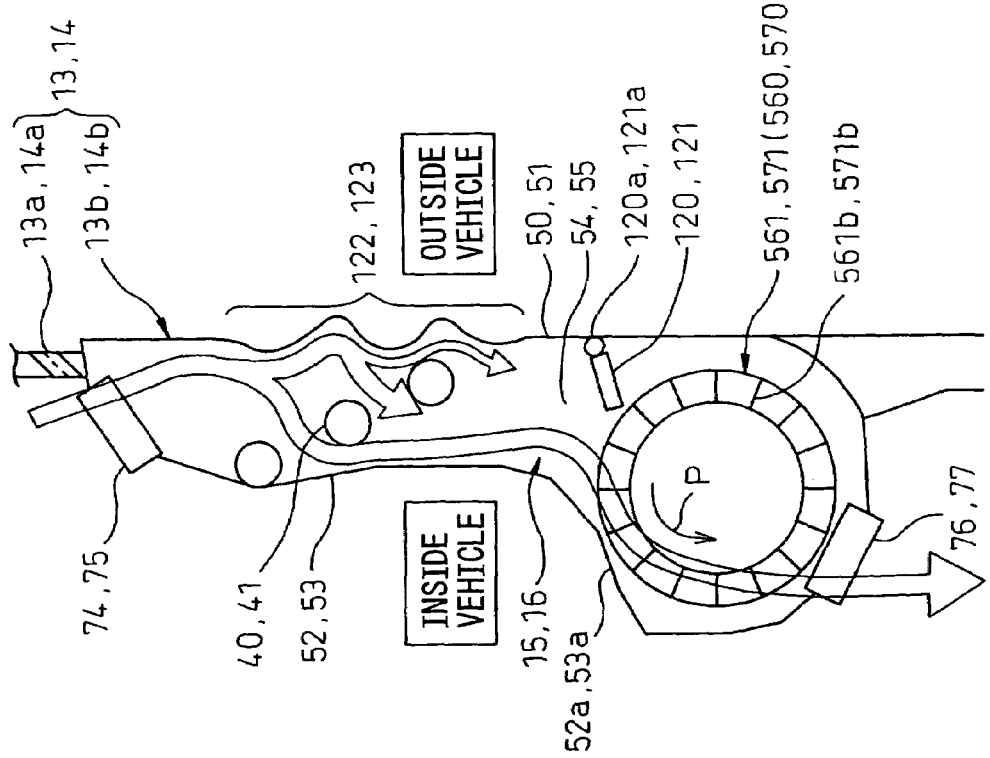
FIG. 22B is a schematic sectional view of a vehicle door portion showing an air conditioning unit of a comparative example at the time of air-heating.

FIGS. 21A and 22A are views showing a flow of air at the time of air-cooling in summer and also showing a flow of air at the time of air-heating in winter in the fifth embodiment, and FIGS. 21B and 22B are views showing a flow of air at the time of air-cooling in summer and also showing a flow of air at the time of air-heating in winter in the comparative example.

In the fifth embodiment, the air guide face 122, 123, the shape of which is convex and concave, is provided in a portion of the outer plate 50, 51 of the door body 13*b*, 14*b* opposed to the heat exchanger 40, 41 for cooling and heating. In other words, the air guide face 122, 123 is provided in a portion of the outer plate 50, 51 in the back of the heat exchanger. As shown in FIGS. 21A and 22A, the convex and concave shape of the air guide face 122, 123 is composed in such a manner that the concave portion and the convex portion are alternately formed in the vertical direction (the air flowing direction) of the vehicle, and the concave portion and the convex portion are formed in the entire region of the air passage of the heat exchanger in the longitudinal direction of the vehicle (the direction perpendicular to the surfaces of the FIGS. 21 and 22).

In this connection, according to the comparative example, the outer plate 50, 51 of the door body 13*b*, 14*b* is formed into a shape substantially linearly extending in the vertical direction of the vehicle. Therefore, in the inner space 54, 55 of the door body 13*b*, 14*b*, in the heat exchanger arranging region located in an upper portion of the cross flow fan 561, 571, air flows substantially linearly along the outer plate 50, 51.

As a result, a quantity of air coming into contact with the heat exchanger 40, 41 is decreased, and the heat transfer performance of the heat exchanger 40, 41 is deteriorated. In addition to that, in the heat exchanger arranging region, air substantially flows linearly along the outer plate 50, 51, and a flow of cold air coming into contact with the inner plate 52, 53 of the door body 13*b*, 14*b* is decreased at the time of air-cooling. Further, a flow of hot air coming into contact with the inner plate 52, 53 is decreased at the time of air-heating. Therefore, the action of cooling the inner plate 52, 53 at the time of air-cooling becomes insufficient and, further, the heating action of heating the inner plate 52, 53 at the time of air-heating becomes insufficient.

On the other hand, in the fifth embodiment, the air guide face 122, 123 composed of a convex and concave shape is provided in a portion of the outer plate 50, 51 of the door body 13*b*, 14*b* opposed to the heat exchanger 40, 41 for cooling and heating. Therefore, in the inner space 54, 55 of the door body 13*b*, 14*b*, in the heat exchanger arranging region, as shown by the arrow in FIGS. 21A and 22A, a flow of air can be positively guided to the inner plate 52, 53 side by the convex and concave shape of the air guide face 122, 123.

As this flow of air guided to the inner plate 52, 53 side flows in the gaps formed between the tubes of the heat exchanger 40, 41 for cooling and heating, a quantity of air coming into contact with the heat exchanger 40, 41 can be essentially increased as compared with the case of the above comparative example, and the heat transfer performance of the heat exchanger 40, 41 can be enhanced. Further, as a cold or hot air, which has been cooled or heated when heat exchanging is conducted by the heat exchanger 40, 41, can be positively guided to the inner plate 52, 53 side, the cooling and heating action (temperature adjustment) of cooling and heating the inner plate 52, 53 can be enhanced as compared with the case of the comparative example.

Therefore, at the time of air-cooling, when the passenger touches the inner plate 52, 53 with the hand, a feeling of coldness can be obtained. Therefore, the feeling (comfort) can be further enhanced at the time of air-cooling. At the time of air-heating, when the passenger touches the inner plate 52, 53 with the hand, the feeling of warmth can be obtained. Therefore, the feeling (comfort) can be further enhanced at the time of air-heating.

In this connection, in the example shown in FIGS. 21A and 21B, the specific shape of the air guide face 122, 123 is a convex and concave shape in which a convex portion and a concave portion are alternately formed in the vertical direction (air flowing direction) of the vehicle. However, it should be noted that the specific shape of the air guide face 122, 123 is not limited to this shape. For example, the air guide face 122, 123 may be composed of only a convex shape which guides a flow of air onto the inner plate 52, 53 side.

Next, the sixth embodiment will be explained below. The sixth embodiment is composed in such a manner that instead of the blower 560, 570 of the fourth embodiment, into which the cross flow fan 561, 571 is incorporated, a plurality of (a large number of) axial blowers are arranged in parallel.

Figure 23:
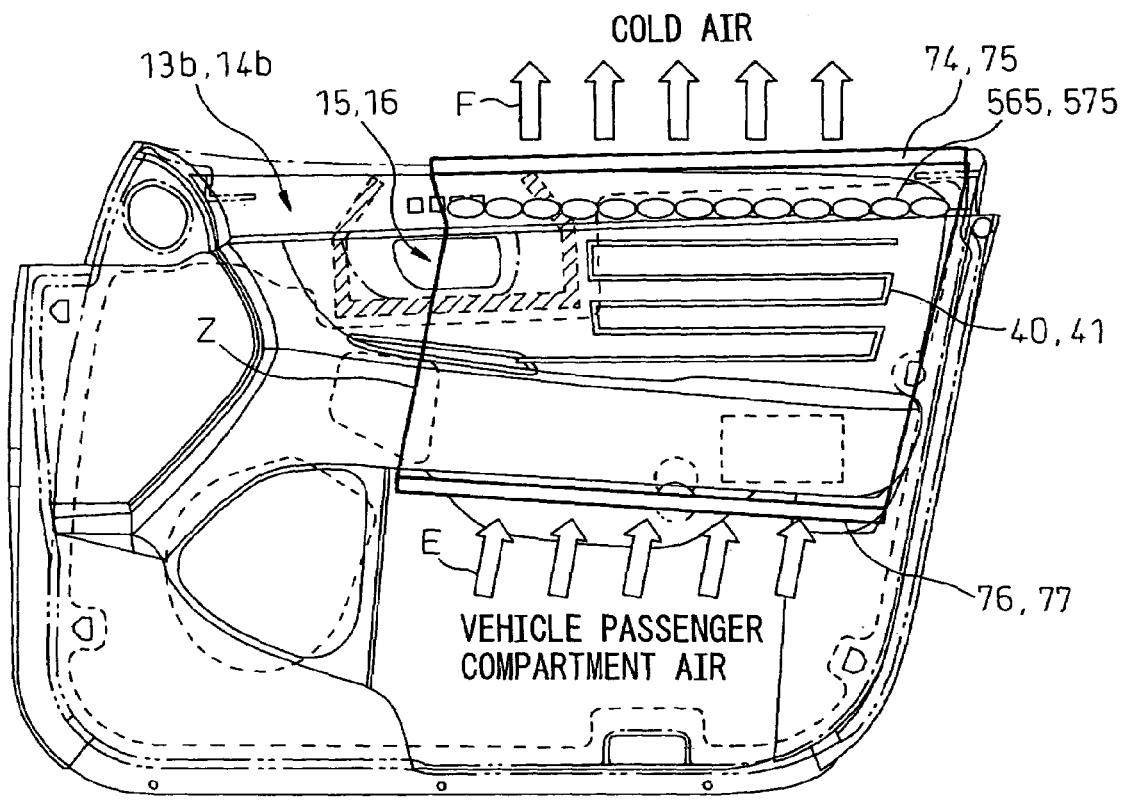
FIG. 23 is a schematic front view of a vehicle door portion showing an air conditioning unit of the sixth embodiment at the time of air-cooling.

FIG. 23 is a view showing the sixth embodiment. In the air passage composed in the inner space 54, 55 (shown in FIGS. 21A, 21B and FIGS. 22A, 22B) of the door body 13*b*, 14*b*, in the portion right below the upper opening portion 74, 75, a large number of axial blowers 565, 575 are arranged in parallel in the longitudinal direction of the vehicle.

Figure 24:
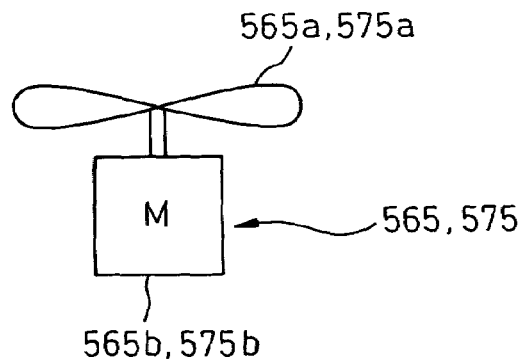
FIG. 24 is a front view showing an axial fan used for the sixth embodiment.

In this case, as shown in FIG. 24, the axial blower 565, 575 is composed as a well known structure in which the axial fan 565*a*, 575*a* is driven by the motor 565*b*, 575*b*. A large number of the axial blowers 565, 575 are arranged in parallel so that the axial direction of each blower can be directed in the vertical direction.

The rotary directions of the motors 565*b*, 575*b* of the large number of the axial blowers 565, 575 are simultaneously changed over between the normal and the reverse rotary direction by the motor control circuit not shown in the drawing. Due to the foregoing, the axial fan 565*a*, 575*a* is rotated in both the normal and the reverse direction, so that the air blowing direction of the axial fan 565*a*, 575*a* can be changed over between the upward and the downward direction.

At the time of air-cooling in summer, the rotary directions of the motor 565*b*, 575*b* and the axial fan 565*a*, 575*a* are set so that the air blowing directions of the large number of axial blowers 565, 575 can be directed from the lower part to the upper part as shown in FIG. 23. On the other hand, at the time of air-heating in winter, the rotary directions of the motor 565b, 575b and the axial fan 565a, 575a are set so that the air blowing directions of the large number of axial blowers 565, 575 can be directed in the opposite direction with respect to the direction shown in FIG. 23, that is, the air blowing directions of the large number of axial blowers 565, 575 can be directed from the upper portion to the lower portion.

Due to the foregoing, even in the constitution in which a large number of the axial blower 565, 575 are arranged in parallel, the thermal comfort at the time of air-cooling and air-heating can be enhanced in the same manner as that of the first embodiment. As a large number of the axial blower 565, 575 are arranged in parallel, the number of the axial blower 565, 575 to be arranged can be freely determined according to the form of the air passage of the door body 13b, 14b. Therefore, the blower can be easily incorporated into the door body 13b, 14b.

Finally, other embodiments will be explained below. In this connection, it should be noted that the present invention is not limited to the above specific embodiments. Variations, which are exemplarily described below, may be made by those skilled in the art.

(1) In the first embodiment, the air conditioning unit 15, 16 is mounted inside the door body 13b, 14b of the vehicle door 13, 14. However, a vehicle, in which the side window is not arranged in the door 13, 14 of the vehicle but arranged on the side wall (the fixed side wall) of the vehicle body, has been put into practical use. In this vehicle, when the air conditioning unit 15, 16 is mounted inside the side wall of the vehicle body located below the side window, the same operational effect as that of the first embodiment can be exhibited.

(2) In the first embodiment and others, the heat exchanger 40, 41 for cooling and heating, in which cold and hot water circulates, is arranged in the air conditioning unit 15, 16 mounted in the door 13b, 14b of the vehicle door 13, 14, and both the cooling function and the heating function can be exhibited by one heat exchanger 40, 41 for cooling and heating. However, in the same manner as that of the second embodiment, both the heat exchanger for cooling and the heat exchanger for heating may be arranged in the air conditioning unit 15, 16 provided in the door.

(3) In the first embodiment, a change may be made as follows. The heat exchanger 40, 41 for cooling and heating, in which hot and cold water is circulated, is not arranged in the air conditioning unit 15, 16 provided in the door. Instead, a cooling and heating device exhibiting a cooling or heating function with Peltier element is arranged in the air conditioning unit 15, 16 provided in the door.

Due to the foregoing, it is unnecessary to arrange a thermal medium pipe for circulating a thermal medium such as hot and cold water in the air conditioning unit 15, 16, which is provided in the door, from the outside of the vehicle door 13, 14 to the air conditioning unit 15, 16.

(4) In the second embodiment, when the air conditioning unit 97 is arranged outside the vehicle door 13, 14, it is arranged in the trunk room 94 at the rear of the rear seat 12a. However, the air conditioning unit 97 may be arranged at an appropriate position in the vehicle passenger compartment. In this case, the air conditioning unit 97 may be arranged being divided into the left air conditioning unit located on the left of the vehicle passenger compartment and the right air conditioning unit located on the right of the vehicle passenger compartment.

While the invention has been described by reference to specific embodiments chosen for purposes of illustration, it should be apparent that numerous modifications could be made thereto by those skilled in the art without departing from the basic concept and scope of the invention.

The invention claimed is:

1. An air conditioner in combination with a vehicle, the air conditioner comprising:
   an opening portion provided in an upper portion of a vehicle side member located immediately under a side window of the vehicle; and
   an air conditioning unit including cooling and heating means for cooling and heating air and also including a blower for blowing air through the cooling and heating means wherein
   the blower comprises a scroll casing having a suction duct and a blowout duct, the scroll casing being rotatable between a first position and a second position;
   when the scroll casing is in the first position, the blowout duct of the blower communicates with the opening portion and the suction duct of the blower communicates with a suction port to suck air from a vehicle passenger compartment at the time of air-cooling;
   when the scroll casing is in the second position, blowout duct of the blower communicates with a blowout port to blow out air to a foot side of the passenger and the suction duct of the blower communicates with the opening portion at the time of air heating;
   at the time of air-cooling, cooled air is sent through the opening portion from the cooling and heating means and blown out from the opening portion along an inner face of the side window to an upper half body of a passenger on the side of the side window,
   at the time of air-heating, air in the neighborhood of the inner face of the side window is sucked into the opening portion and made to pass through the cooling and heating means so that the air can be heated, and the heated air is blown out to the foot side of the passenger.

2. An air conditioner in combination with a vehicle, the air conditioner being mounted on the vehicle provided with a vehicle door having a side window and also having a door body located in a lower portion of the side window, the air conditioner comprising:
   an upper opening portion provided in an upper portion of the door body immediately under the side window and open to a vehicle passenger compartment;
   a lower opening portion provided in a lower portion of the door body and open to the vehicle passenger compartment; and
   an air conditioning unit arranged inside the door body, wherein
   the air conditioning unit includes cooling and heating means for cooling and heating air and also includes a blower for blowing air through the cooling and heating means, the blower having a scroll casing defining a suction duct and a blowout duct, the scroll casing being rotatable between a first and a second position;
   at the time of air-cooling, the scroll casing is rotated to the first position and air is sucked from the vehicle passenger compartment through the lower opening portion into the suction duct of the blower and is made to pass through the discharge duct, through the cooling and heating means so that the air can be cooled, the thus cooled air is sent through the upper opening portion and blown out from the upper opening portion along an inner face of the side window to an upper half body of a passenger on the side of the side window, at the time of air-heating, the scroll casing is rotated to the second position and air is sucked from a neighborhood of the inner face of the side window through the upper opening portion and is made to pass through the cooling and heating means into the suction duct of the blower so that the air can be heated, and the thus heated air is sent through the discharge duct and through the lower opening portion and blown out from the lower opening portion to a foot side of the passenger.

3. The combination according to claim 2, wherein the cooling and heating means includes one heat exchanger into which a thermal medium for cooling flows at the time of air-cooling so as to cool the sucked air, and into which a thermal medium for heating flows at the time of air-heating so as to heat the sucked air.

4. The combination according to claim 3, wherein a thermal medium pipe for circulating a thermal medium for cooling and a thermal medium for heating in the heat exchanger is arranged so that the thermal medium pipe can be thermally combined with the inner plate of the door body.

5. The combination according to claim 3, wherein the thermal medium for heating is hot water heated by a heat source mounted on a vehicle, the thermal medium for cooling is cold water cooled by a cooling source mounted on the vehicle, and the air conditioner for vehicle use includes a valve means for adjusting a flow of the hot and cold water to the heat exchanger.

6. An air conditioner in combination with a vehicle, the air conditioner being mounted on the vehicle provided with a vehicle side body having a side window and also having a body side member located in a lower portion of the side window, the air conditioner comprising:

an upper opening portion provided in an upper portion of the body side member immediately under the side window and open to a vehicle passenger compartment;

a lower opening portion provided in a lower portion of the body side member and open to the vehicle passenger compartment; and an air conditioning unit arranged inside the body side member, wherein the air conditioning unit includes cooling and heating means for cooling and heating air and also includes a blower for blowing air through the cooling and heating means, the blower having a scroll casing defining a suction duct and a discharge duct, the scroll casing being rotatable between a first position and a second position;

at the time of air-cooling, the scroll casing is rotated to the first position and air is sucked from the vehicle passenger compartment through the lower opening portion into the suction duct of the blower and is made to pass through the cooling and heating means so that the air can be cooled, the thus cooled air is sent through the upper opening portion and blown out from the upper opening portion along an inner face of the side window to an upper half body of a passenger on the side of the side window, at the time of air-heating, the scroll casing is rotated to the second position and air is sucked from a neighborhood of the inner face of the side window through the upper opening portion and is made to pass through the cooling and heating means into the suction side of the blower so that the air can be heated, and the thus heated air is sent through the lower opening portion and blown out from the lower opening portion to a foot side of the passenger.

7. The combination according to claim 6, wherein said scroll casing further comprises air flow changeover means for changeover of air flow, the air flow changeover means communicating a blowout side of the blower with the upper opening portion and also communicating a suction side of the blower with the lower opening portion at the time of air-cooling, and the air flow changeover means communicating the blowout side of the blower with the lower opening portion and also communicating the suction side of the blower with the upper opening portion at the time of air-heating.

8. An air conditioner in combination with a vehicle, the air conditioner being mounted on the vehicle provided with a vehicle door having a side window and also having a door body located in a lower portion of the side window, the air conditioner comprising:

an upper opening portion provided in an upper portion of the door body immediately under the side window and open to a vehicle passenger compartment;

a lower opening portion provided in a lower portion of the door body and open to the vehicle passenger compartment; and an air conditioning unit arranged inside the door body, wherein the air conditioning unit includes cooling and heating means for cooling and heating air and also includes a blower for blowing air through the cooling and heating means, at the time of air-cooling, air is sucked from the vehicle passenger compartment into the lower opening portion and is made to pass through the cooling and heating means so that the air can be cooled, the thus cooled air is sent through the upper opening portion and blown out from the upper opening portion along an inner face of the side window to an upper half body of a passenger on the side of the side window, at the time of air-heating, air is sucked from a neighborhood of the inner face of the side window into the upper opening portion and is made to pass through the cooling and heating means so that the air can be heated, and the thus heated air is sent through the lower opening portion and blown out from the lower opening portion to a foot side of the passenger;

the cooling and heating means includes one heat exchanger into which a thermal medium for cooling flows at the time of air-cooling so as to cool the sucked air, and into which a thermal medium for heating flows at the time of air-heating so as to heat the sucked air; and a thermal medium pipe for circulating a thermal medium for cooling and a thermal medium for heating in the heat exchanger is arranged so that the thermal medium pipe is thermally combined with the inner plate of the door body.

* * * * *